US010567725B2

(12) United States Patent
Uchimura et al.

(10) Patent No.: US 10,567,725 B2
(45) Date of Patent: Feb. 18, 2020

(54) INFORMATION PROCESSING APPARATUS, INFORMATION RECORDING MEDIUM, INFORMATION PROCESSING METHOD, AND PROGRAM

(71) Applicant: SONY CORPORATION, Tokyo (JP)

(72) Inventors: Kouichi Uchimura, Kanagawa (JP); Yoshiyuki Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/769,007

(22) PCT Filed: Nov. 4, 2016

(86) PCT No.: PCT/JP2016/082823
§ 371 (c)(1),
(2) Date: Apr. 17, 2018

(87) PCT Pub. No.: WO2017/082175
PCT Pub. Date: May 18, 2017

(65) Prior Publication Data
US 2019/0058855 A1  Feb. 21, 2019

(30) Foreign Application Priority Data

Nov. 12, 2015 (JP) .................................. 2015-222277
Sep. 15, 2016 (JP) .................................. 2016-181010

(51) Int. Cl.
*H04N 9/80* (2006.01)
*G11B 27/32* (2006.01)
(Continued)

(52) U.S. Cl.
CPC .............. *H04N 9/80* (2013.01); *G06T 5/009* (2013.01); *G09G 5/026* (2013.01); *G11B 27/326* (2013.01);
(Continued)

(58) Field of Classification Search
CPC .......... H04N 9/80; H04N 5/85; H04N 9/8205; G11B 27/11; G11B 27/28; G11B 27/326; G06T 5/009; G09G 5/026
See application file for complete search history.

(56) References Cited

U.S. PATENT DOCUMENTS

2016/0065923 A1*  3/2016  Arai ........................ H04N 9/67
                                                            345/590
2016/0100216 A1*  4/2016  Chujoh ............ H04N 21/23432
                                                            725/93
(Continued)

FOREIGN PATENT DOCUMENTS

JP       2011-023071 A    2/2011
WO   WO 2015/166644 A1  11/2015

OTHER PUBLICATIONS

ITU-R, "Parameter values for the HDTV standards for production and international programme exchange", Recommendation ITU-R BT.709-6, Jun. 2015, pp. i-17, Geneva, CH.
(Continued)

*Primary Examiner* — Mishawn N. Hunter
(74) *Attorney, Agent, or Firm* — Paratus Law Group, PLLC

(57) ABSTRACT

There is provided an information processing apparatus that reproduces data recorded onto a recording medium, the apparatus including: circuitry configured to convert a color space of an image recorded onto the recording medium, and superimpose a main content image and a sub-content image recorded onto the recording medium, wherein, when a color space of the main content image corresponds to BT.709 format, the circuitry determines to convert color spaces of the sub-content image and the main content image into the same color space, and wherein, when the color space of the main content image corresponds to BT.2020 format, the (Continued)

circuitry determines to not convert the color space of the sub-content image into BT.2020 format.

6 Claims, 23 Drawing Sheets

(51) Int. Cl.
*G09G 5/02* (2006.01)
*G06T 5/00* (2006.01)
*G06T 5/50* (2006.01)

(52) U.S. Cl.
CPC ...... *G06T 5/50* (2013.01); *G06T 2207/20208* (2013.01); *G09G 2320/0673* (2013.01); *G09G 2340/06* (2013.01)

(56) References Cited

U.S. PATENT DOCUMENTS

2016/0295219 A1* 10/2016 Ye ........................... H04N 19/96
2017/0048561 A1* 2/2017 Oh ........................... H04N 21/23

OTHER PUBLICATIONS

ITU-R, "Parameter values for ultra-high definition television systems for production and international programme exchange", Recommendation ITU-R BT.2020-2, Oct. 2015, pp. i-6, Geneva, CH.

\* cited by examiner

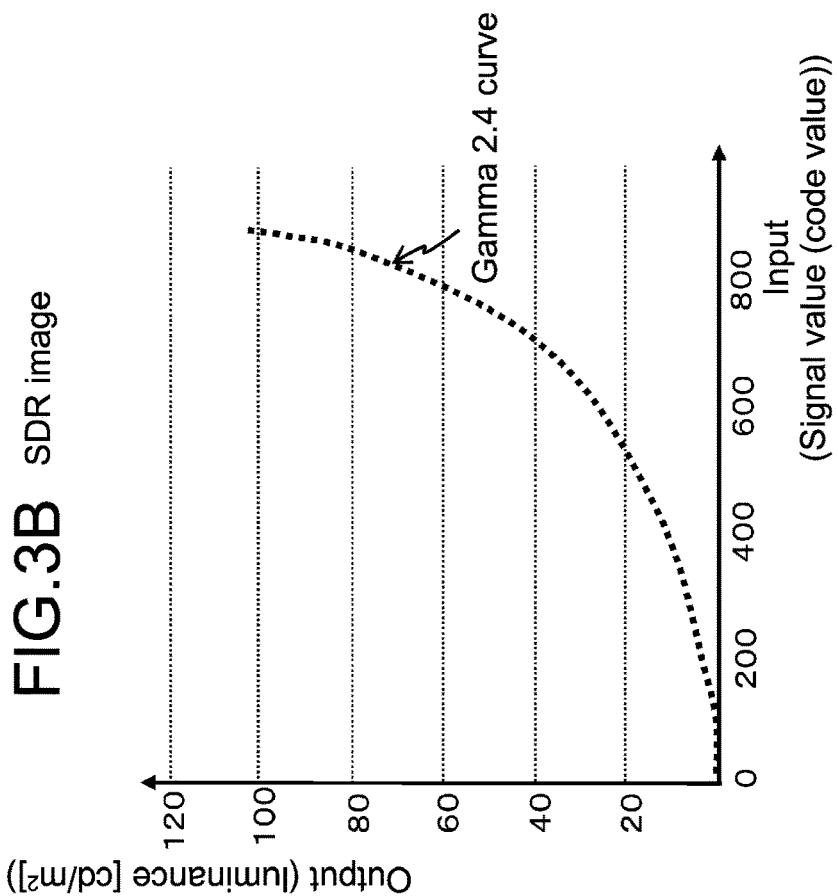
FIG.3B SDR image
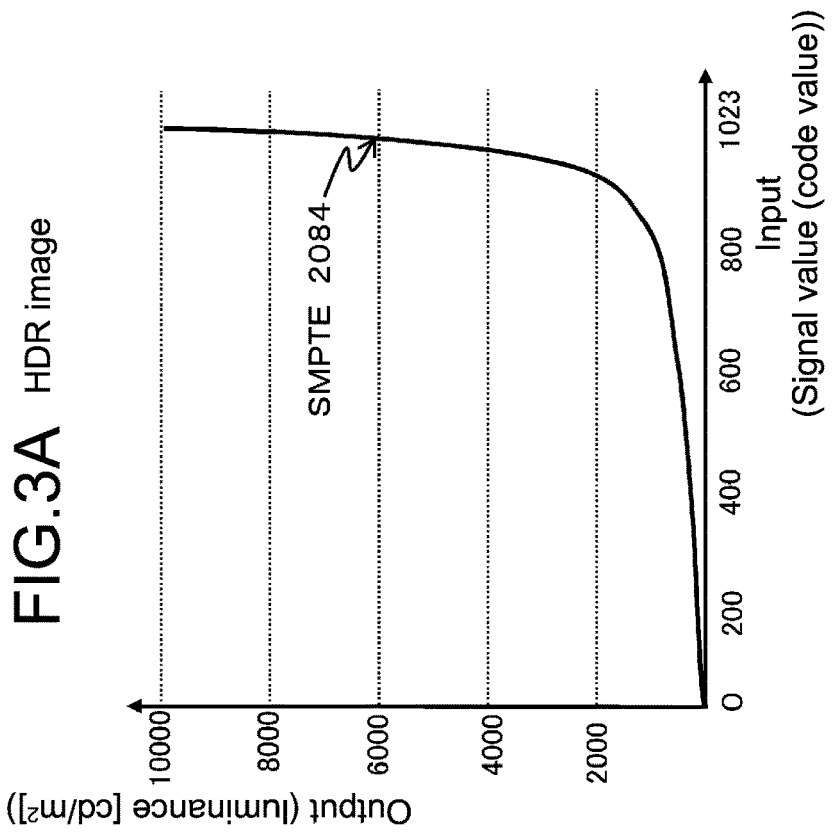
FIG.3A HDR image

INFORMATION PROCESSING APPARATUS, INFORMATION RECORDING MEDIUM, INFORMATION PROCESSING METHOD, AND PROGRAM

CROSS REFERENCE TO RELATED APPLICATIONS

This application is a National Stage Patent Application of PCT International Patent Application No. PCT/JP2016/082823 filed Nov. 4, 2016 under 35 U.S.C. § 371, which claims the benefit of Japanese Priority Patent Application JP 2015-222277 filed Nov. 12, 2015 and Japanese Priority Patent Application JP 2016-181010 filed Sep. 15, 2016, the entire contents of which are incorporated herein by reference.

TECHNICAL FIELD

The present disclosure relates to an information processing apparatus, an information recording medium, an information processing method, and a program, more specifically, to an information processing apparatus, an information recording medium, an information processing method, and a program that are applied for outputting HDR (High Dynamic Range) images having expanded color and luminance ranges as compared to SDR (Standard Dynamic Range) images of the related art.

BACKGROUND ART

As an information recording medium (media) that records various contents such as movies and music, DVDs (Digital Versatile Discs) and BDs (Blu-ray (registered trademark) Discs) are widely used.

As media that record contents such as movies in advance. BD-ROMs record data of audio, subtitles, and the like together with HD (High Definition) images as high definition images, for example.

Current BD-ROMs mainly record HD images, that is, so-called high definition 2K images in many cases. However, image qualities are expected to become higher and media that record ultra-high definition images (UHD: Ultra High Definition images) are expected to increase in the future.

It should be noted that while high resolution images such as 4K images and 8K images are typical examples of the ultra-high definition image (UHD image), the UHD image is not limited thereto, and high dynamic range images having an extended output luminance level, images having a wide output color space, and the like are also called UHD images.

Media that record such UHD images are expected to increase in the future.

It should be noted that descriptions on data recording/reproducing processing that uses a BD, or 4K images can be found in, for example, Patent Document 1 (Japanese Patent Application Laid-open No. 2011-023071) and the like.

It is presumed that HDR (High Dynamic Range) images having expanded color and luminance ranges that can be output will be widely used as the ultra-high definition image (UHD image).

It should be noted that images of the related art, that have narrower color and luminance ranges that can be output than HDR images, are called SDR (Standard Dynamic Range) images.

Comparing with the SDR images of the related art, the HDR image has expanded color and luminance ranges that can be output, and a more-natural image similar to an actual scene seen by eyes of a person can thus be output.

For example, the color range of an SDR image that can be output refers to colors within the range of a color space rule: BT.709 color space. On the other hand, the HDR image is set to be capable of outputting colors of a BT.2020 color space wider than the BT.709 color space.

However, in a disc that records a plurality of contents, such as a BD (Blu-ray (registered trademark) Disc), for example, contents of different image qualities may be mixed as in a case where a main content such as a main part of a movie is recorded as HDR images and other sub-contents are recorded as SDR images.

Specifically, a configuration in which a sub-content stored in the BD together with the main content, that is, a sub-content generated by a BD-J, which is a Java (registered trademark) program, for example, is a content constituted of SDR images is assumed.

The BD-J is a program that outputs various types of data, which includes a program that executes processing of outputting a menu screen and processing of outputting thumbnail images and animation images, and is recorded onto a disc (BD) as a program accompanying a main content.

When a content such as a movie, which is a main content recorded onto a BD, is constituted of HDR images and the BD-J is a program that executes processing of outputting SDR images, a main movie content is displayed as HDR images on a television screen that displays reproduced images, and a menu screen as an SDR image generated by the execution of the BD-J is displayed on a part of the screen, for example.

CITATION LIST

Patent Literature

[PTL 1] Japanese Patent Application Laid-open No. 2011-023071

SUMMARY

Technical Problem

However, as described above, the HDR images and SDR images have different color ranges that can be output. For example, even the same red color differs between an HDR image display area and an SDR image display area, with the result that viewers may sense a feeling of strangeness.

The present disclosure has been made in view of the problem as described above, for example, and aims at providing an information processing apparatus, an information recording medium, an information processing method, and a program that realize content outputs that do not cause a large difference in color shades and the like between HDR (High Dynamic Range) images that constitute a first content such as a movie, and images constituting a second content such as a menu.

Further, the main content becomes HDR or SDR images, and the sub-content also becomes HDR or SDR images. Furthermore, in either of the HDR images or SDR images, it is assumed that there are various combinations regarding a color space to be actually used.

Therefore, the present disclosure aims at providing an information processing apparatus, an information recording medium, an information processing method, and a program that take into consideration a processing load of the information processing apparatus, a load of a content producer, and a feeling of strangeness of viewers while there are various combinations of dynamic ranges and color spaces in images of a main content and a sub-content, for example.

Solution to Problem

According to a first aspect of the present disclosure, there is provided an information processing apparatus that reproduces data recorded onto a recording medium, the apparatus including:
circuitry configured to
convert a color space of an image recorded onto the recording medium, and
superimpose a main content image and a sub-content image recorded onto the recording medium,
wherein, when a color space of the main content image corresponds to BT.709 format, the circuitry determines to convert color spaces of the sub-content image and the main content image into the same color space, and
wherein, when the color space of the main content image corresponds to BT.2020 format, the circuitry determines to not convert the color space of the sub-content image into BT.2020 format.

According to a second aspect of the present disclosure, there is provided an information processing apparatus that reproduces data recorded onto a recording medium, the apparatus including:
circuitry configured to
convert a color space of an image recorded onto the recording medium, and
superimpose a main content image and a sub-content image recorded onto the recording medium,
wherein, when a color space of the main content image corresponds to BT.709 format, the circuitry determines to convert color spaces of the sub-content image and the main content image into the same color space, and
wherein, when the color space of the main content image corresponds to BT.2020 format, no color space conversion is applied to the color space of the sub-content image.

According to a third aspect of the present disclosure, there is provided an information processing method for reproducing data recorded onto a recording medium, the method including:
converting a color space of an image recorded onto the recording medium; and superimposing a main content image and a sub-content image recorded onto the recording medium,
wherein, when a color space of the main content image corresponds to BT.709 format, the color spaces of the sub-content image and the main content image are converted into the same color space, and
wherein, when the color space of the main content image corresponds to BT.2020 format, the color space of the sub-content image is not converted into BT.2020 format.

According to a fourth aspect of the present disclosure, there is provided a non-transitory computer-readable medium having embodied thereon a program, which when executed by a computer causes the computer to execute an information processing method for reproducing data recorded onto a recording medium, the method including:
converting a color space of an image recorded onto the recording medium; and
superimposing a main content image and a sub-content image recorded onto the recording medium,
wherein, when a color space of the main content image corresponds to BT.709 format, the color spaces of the sub-content image and the main content image are converted into the same color space, and
wherein, when the color space of the main content image corresponds to BT.2020 format, the color space of the sub-content image is not converted into BT.2020 format.

According to a fifth aspect of the present disclosure, there is provided an information processing apparatus including
a data processing unit that executes processing of reproducing data recorded onto an information recording medium.
the data processing unit
judging whether a main content recorded onto the information recording medium is an HDR (High Dynamic Range) image, and
inputting, when the main content is an HDR image, in output image generation processing of a sub-content that is to be reproduced with the main content, RGB values that are constituent pixel values of a sub-content output from a sub-content source to a format conversion unit, converting the RGB values into HDR-image-supporting YCbCr signals according to a specified conversion rule, and generating output image signals using the conversion signals.

Further, according to a sixth aspect of the present disclosure, there is provided an information processing apparatus including
a data processing unit that executes processing of generating data to be recorded onto an information recording medium.
the data processing unit
judging whether a main content to be recorded onto the information recording medium is an HDR (High Dynamic Range) image, and
setting, when the main content is an HDR image, in generation processing of a sub-content that is to be recorded onto the information recording medium together with the main content, RGB values that are constituent pixel values of the sub-content to RGB values obtained by converting HDR-image-supporting YCbCr signals according to a specified conversion rule.

Further, according to a seventh aspect of the present disclosure, there is provided an information recording medium that records a main content and a sub-content together with the main content,
in which
when the main content is an HDR (High Dynamic Range) image,
the sub-content is a sub-content whose RGB values, that are constituent pixel values of the sub-content, are set as RGB values obtained by converting HDR-image-supporting YCbCr signals according to a specified conversion rule, and
the main content and the sub-content to be reproduced can both be output as HDR images in a reproducing apparatus that reproduces contents from the information recording medium.

According to an eighth aspect of the present disclosure, there is provided an information processing method executed in an information processing apparatus including a data processing unit that executes processing of reproducing data recorded onto an information recording medium, the method including:

by the data processing unit,
  judging whether a main content recorded onto the information recording medium is an HDR (High Dynamic Range) image; and
  inputting, when the main content is an HDR image, in output image generation processing of a sub-content that is to be reproduced with the main content, RGB values that are constituent pixel values of a sub-content output from a sub-content source to a format conversion unit, converting the RGB values into HDR-image-supporting YCbCr signals according to a specified conversion rule, and generating output image signals using the conversion signals.

According to a ninth aspect of the present disclosure, there is provided an information processing method executed in an information processing apparatus including a data processing unit that executes processing of generating data to be recorded onto an information recording medium, the method including:

by the data processing unit,
  judging whether a main content to be recorded onto the information recording medium is an HDR (High Dynamic Range) image; and
  setting, when the main content is an HDR image, in the generation processing of a sub-content that is to be recorded onto the information recording medium together with the main content, RGB values that are constituent pixel values of the sub-content to RGB values obtained by converting HDR-image-supporting YCbCr signals according to a specified conversion rule.

Further, according to a tenth aspect of the present disclosure, there is provided a program that causes information processing to be executed in an information processing apparatus including a data processing unit that executes processing of reproducing data recorded onto an information recording medium, the program causing the data processing unit to execute:

processing of judging whether a main content recorded onto the information recording medium is an HDR (High Dynamic Range) image; and
  processing of inputting, when the main content is an HDR image, in output image generation processing of a sub-content that is to be reproduced with the main content, RGB values that are constituent pixel values of a sub-content output from a sub-content source to a format conversion unit, converting the RGB values into HDR-image-supporting YCbCr signals according to a specified conversion rule, and generating output image signals using the conversion signals.

Further, according to a eleventh aspect of the present disclosure, there is provided a program that causes information processing to be executed in an information processing apparatus including a data processing unit that executes processing of reproducing data recorded onto an information recording medium, the program causing the data processing unit to execute:

processing of judging whether a main content to be recorded onto the information recording medium is an HDR (High Dynamic Range) image; and
  processing of setting, when the main content is an HDR image, in the generation processing of a sub-content that is to be recorded onto the information recording medium together with the main content, RGB values that are constituent pixel values of the sub-content to RGB values obtained by converting HDR-image-supporting YCbCr signals according to a specified conversion rule.

It should be noted that the program of the present disclosure is a program that can be provided to an information processing apparatus or a computer system capable of executing various program codes, for example, via a computer-readable storage medium or a communication medium. By providing such a program in a computer-readable format, processing corresponding to the program can be realized in the information processing apparatus or the computer system.

Further, according to an twelfth aspect of the present disclosure, there is provided an information processing apparatus that reproduces data recorded onto a recording medium, including:

a color space conversion unit that converts a color space of an image recorded onto the recording medium; and
  an image superimposition unit that superimposes a main content image and a sub-content image recorded onto the recording medium,
  the color space conversion unit converting, when a color space of the main content image is BT.709, color spaces of the sub-content image and the main content image into the same color space and avoiding converting, when the color space of the main content image is BT.2020, the color space of the sub-content image into BT.2020. Further, the information processing apparatus further includes a dynamic range conversion unit that converts a dynamic range of the image, and
  the dynamic range conversion unit avoids converting, when a dynamic range of the main content image is HDR, a dynamic range of the sub-content image into HDR.

These and other objects, features, and advantages of the present disclosure will become more apparent in light of the following detailed description of best mode embodiments thereof, as illustrated in the accompanying drawings. It should be noted that the system used in the specification refers to a logical group configuration of a plurality of apparatuses, and the apparatuses having the respective structures do not need to be provided in the same casing.

Advantageous Effects

With the configurations according to embodiments of the present disclosure, it is possible to avoid an output in which HDR images and SDR images are mixed and realize an image output having a uniform image quality.

Specifically, when the main content recorded onto the information recording medium is an HDR image, RGB values that are constituent pixel values of a sub-content to be recorded onto the information recording medium together with the main content are set to RGB values obtained by converting HDR-image-supporting YCbCr signals according to a specified conversion rule (ITU-R). In the sub-content output image generation processing, the reproducing apparatus inputs RGB values that are constituent pixel values of a sub-content output from the sub-content source to the format conversion unit, converts the RGB values into HDR-image-supporting YCbCr signals according to the specified conversion rule (ITU-R), and generates output image signals using the conversion signals.

With this structure, it is possible to avoid an output in which HDR images and SDR images are mixed and realize an image output having a uniform image quality.

Furthermore, with the structure according to embodiments of the present disclosure, by prohibiting dynamic range conversion processing and color space processing, a load on the information processing apparatus and a load on a content producer can be reduced.

Specifically, even when the main content is constituted of HDR images, dynamic conversion processing of SDR images constituting a sub-content is not carried out. In addition, even when the main content is constituted of images conforming to BT.2020 as a wide color space, wide color gamut conversion processing of images constituting a sub-content, that conform to BT.709, is not carried out.

It should be noted that the effects described in the specification are mere examples and should not be limited thereto. Moreover, additional effects may also be obtained.

BRIEF DESCRIPTION OF DRAWINGS

FIGS. 3A and 3B are diagrams for explaining an input/output (signal value-luminance) correspondence relationship of an HDR image and an SDR image.

DESCRIPTION OF EMBODIMENTS

Figure 1:
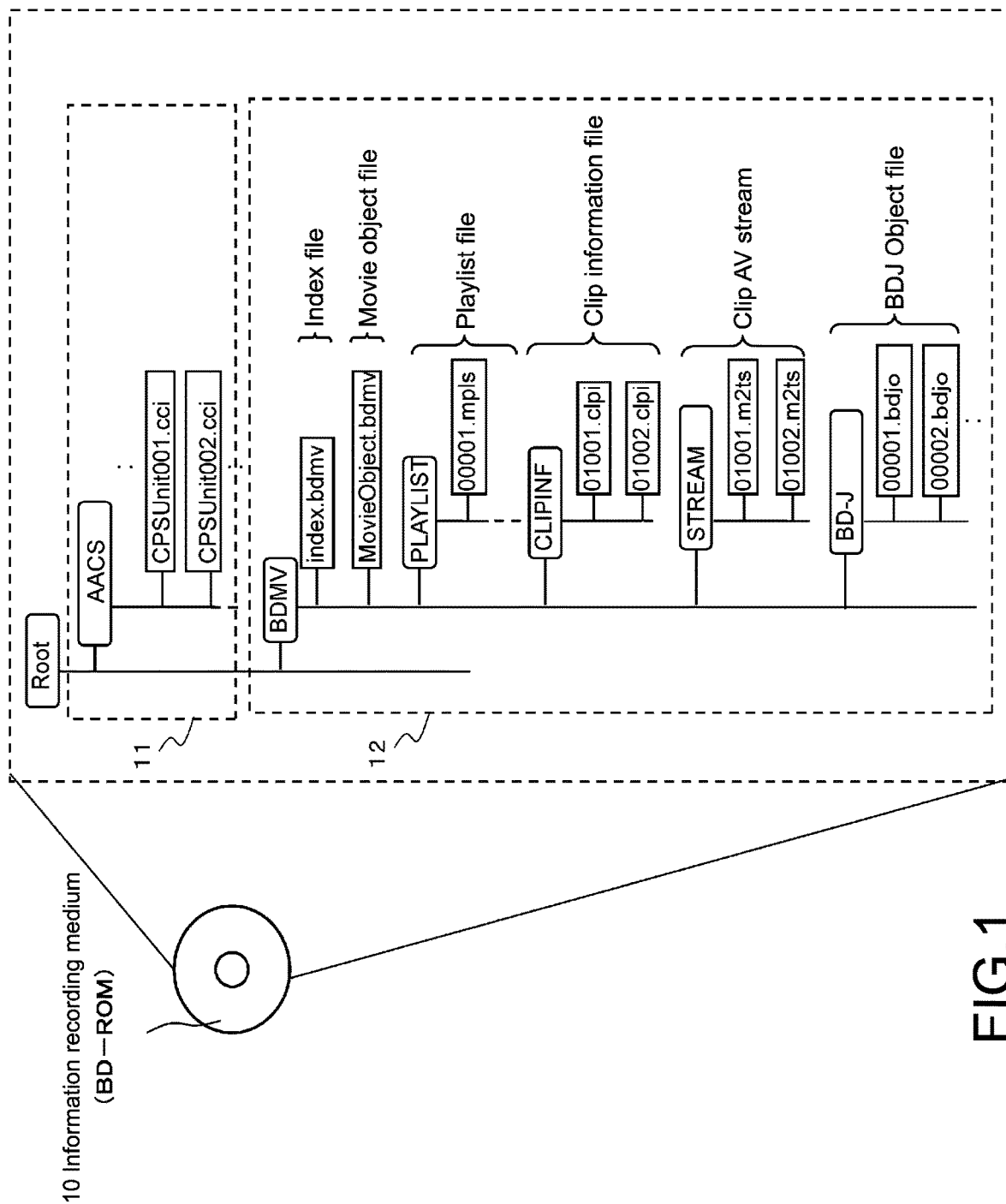
FIG. 1 is a diagram for explaining a configuration example of data recorded onto a BD (Blu-ray (registered trademark) Disc).

Hereinafter, an information processing apparatus, an information recording medium, an information processing method, and a program according to the present disclosure will be described in detail with reference to the drawings. It should be noted that the descriptions will be made according to the following items.
1. Regarding recording data of information recording medium and reproduction processing example
2. Regarding HDR image and SDR image
3. Regarding HDR image. SDR image, image content generation, and reproduction processing example
4. Regarding problematic points in performing superimposition display processing of HDR image data and SDR image data
5. Regarding processing example of outputting superimposed image of plurality of contents as image having sense of unity
6. Regarding content generation and recording processing sequence and reproduction sequence
7. Regarding processing example in which restriction is provided in conversion processing
8. Regarding configuration example of information processing apparatus
9. Conclusion of configuration of present disclosure 1. REGARDING RECORDING DATA OF INFORMATION RECORDING MEDIUM AND REPRODUCTION PROCESSING EXAMPLE First, descriptions will be given on recording data of a disc as an information recording medium, such as a BD (Blu-ray (registered trademark) Disc), and a reproduction processing example thereof.

In addition to data of images, audio, subtitles, and the like as data to be reproduced, various types of data such as a reproduction control information file and a management information file that are applied to reproduction processing of those data are recorded onto a disc.

For example, on a disc that records contents such as a movie, a clip AV stream file constituted of a TS (Transport Stream) packet that stores data of images, audio, subtitles, and the like as data to be reproduced is recorded.

In addition, a clip information file as a control file set in accordance with the clip AV stream file, a playlist file, a movie object file that stores a reproduction program, an index file that records content title information and the like, an encryption key file that stores a key used to decode a content, and various other management information files are also recorded.

With reference to FIG. 1, a configuration example of data recorded onto a BD (Blu-ray (registered trademark) Disc) will be described.

FIG. 1 is a diagram showing a directory of recording data in a BDMV format, that is recorded on an information recording medium (disc) 10 as, for example, a BD-ROM as a ROM-type BD or a BD-UHD-ROM that stores a UHD (Ultra High Definition) image as an ultra-high definition image.

As shown in FIG. 1, the directory is separated into a management information setting section 11 (AACS directory) and a data section 12 (BDMV directory). In the management information setting section 11 (AACS directory), a CPS unit key file as a data encryption key, a usage control information file, and the like are stored.

On the other hand, subordinate to the BDMV directory of the data section 12, for example, the following files are recorded.
Index file
Movie object file
Playlist file
Clip information file
Clip AV stream file
BD-J file The index file stores title information as index information to be applied to the reproduction processing, and the like.

The movie object file stores a reproduction program designated by a title.

The playlist file is a file that specifies a content reproduction order and the like according to program information of the reproduction program designated by the title and includes designation information with respect to clip information including reproduction position information.

The clip information file is a file designated by the playlist file and includes reproduction position information of a clip AV stream file and the like.

The clip AV stream file is a file that stores AV stream data to be reproduced.

The BD-J file is a file that stores JAVA (registered trademark) programs, commands, and the like.

For example, programs for executing output processing etc. of various display images in menu display, thumbnail display, animation display, and the like, image data for output, and the like are stored.

The sequence in which the information processing apparatus reproduces contents recorded onto the information recording medium is as follows.
(a) First, a specific title is designated from an index file by a reproduction application.
(b) A reproduction program associated with the designated title is selected.
(c) A playlist specifying a content reproduction order and the like according to program information of the selected reproduction program is selected.
(d) An AV stream or command as content actual data is read out based on clip information specified in the selected playlist, and the AV stream or command is reproduced or executed.

Figure 2:
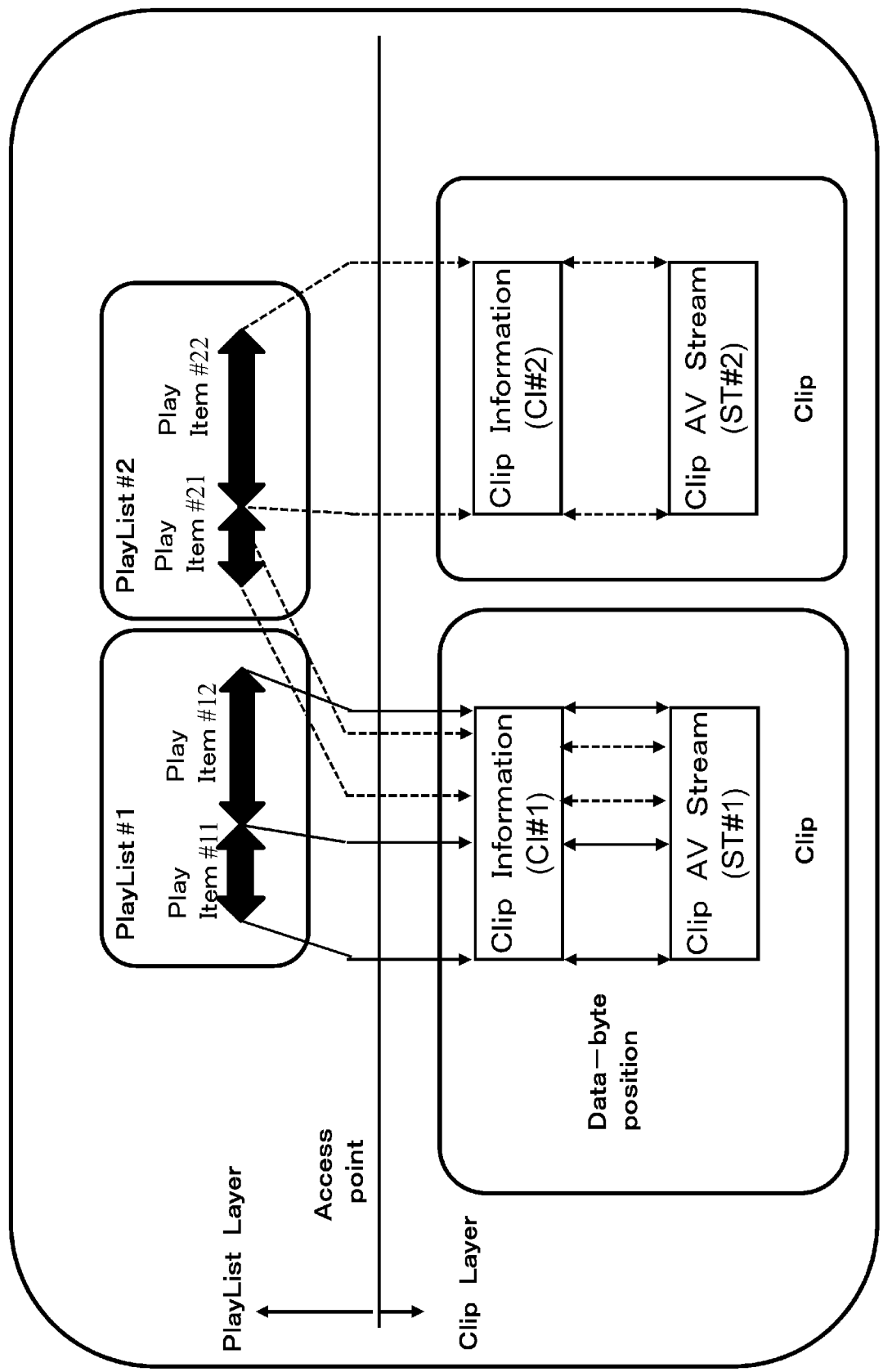
FIG. 2 is a diagram for explaining a correspondence relationship of data recorded onto an information recording medium (disc) and a reproduction processing example thereof.

FIG. 2 is a diagram showing a correspondence relationship among the following data, that is,
the playlist file,
the clip information file, and
the clip AV stream file,
that are recorded onto an information recording medium (disc) 200.

AV streams constituted of image and audio data as actual data to be reproduced are each recorded as a clip AV stream (Clip AV Stream) file, and a playlist (PlayList) file and clip information (Clip Information) file are specified as management information and reproduction control information file of those AV streams.

As shown in FIG. 2, these files belonging to a plurality of categories can be sorted into the following two layers, that is,
a playlist layer including the playlist (PlayList) file, and
a clip layer constituted of the clip AV stream (Clip AV Stream) file and clip information (Clip Information) file.

It should be noted that one clip information (Clip Information) file is associated with one clip AV stream (Clip AV Stream) file, and considering a pair of those as one object, those files may collectively be referred to as clip (Clip).

Detailed information of data included in the clip AV stream file, for example, management information such as an EP map that records I picture position information of MPEG data, is recorded in the clip information file.

The clip AV stream (Clip AV Stream) file stores data obtained by arranging an MPEG-2TS (transport stream) according to a specified configuration of a BDMV format.

Further, the clip information (Clip Information) file stores management information for acquiring a reproduction start position of storage data of the clip AV stream file and the like, such as correspondence data among a data position of byte sequence data of the clip AV stream file, a reproduction time position such as an entry point (EP), which is a reproduction start point when developed on a time axis, and the like.

For example, when a time stamp indicating a reproduction time elapse position since the content start point is given, a data reading position of the clip AV stream file, that is, an address as the reproduction start point, can be acquired with reference to the clip information file.

The playlist (PlayList) file includes designation information of a reproduction section with respect to reproducible data included in the clip (=clip information file+clip AV stream file) layer.

One or more play items (PlayItem) are set in the playlist (PlayList) file, and each of the play items includes the designation information of a reproduction section with respect to reproducible data included in the clip (=clip information file+clip AV stream file) layer.

It should be noted that the clip AV stream (Clip AV Stream) file storing actual data of images and audio to be reproduced has an MPEG-2 transport stream (TS: Transport stream) file configuration.

2. REGARDING HDR IMAGE AND SDR IMAGE

Next, descriptions will be given on a high dynamic range (HDR: High Dynamic Range) image having enlarged color and luminance ranges that can be output, and an SDR (Standard Dynamic Range) image of the related art.

Image data constituting contents provided from broadcast stations or servers or contents stored in an information recording medium (media) is changing to high definition images over time. Specifically, 2K images that have been used up to now are shifting to high resolution images called 4K or 8K images.

Furthermore, usage of high dynamic range (HDR: High Dynamic Range) images capable of exactly reproducing images having a wider luminance range from low luminance to high luminance than SDR (Standard Dynamic Range) images that have been used up to now, is prevailing.

The HDR image has more expressible colors and a higher dynamic range than SDR images and is capable of expressing every luminance within a visible range and supporting a dynamic range and color gamut that are substantially equivalent to visual features of human beings.

Images to be reproduced recorded on the information recording medium, that have been described with reference to FIGS. 1 and 2, specifically, images stored in the clip AV stream (Clip AV Stream) file, are apt to successively shift from the SDR (Standard Dynamic Range) images of the related art to the HDR (High Dynamic Range) images.

Hereinafter, the SDR (Standard Dynamic Range) images of the related art and the HDR (High Dynamic Range) images having enlarged color and luminance ranges that can be output as compared to the SDR images will be described.

FIG. 3 are graphs each showing a signal value-display luminance correspondence relationship of the HDR image and the SDR image. The graphs are as follows.
(A) Correspondence relationship graph of input signal value and output luminance value of HDR image
(B) Correspondence relationship graph of input signal value and output luminance value of SDR image The abscissa axes of FIGS. 3A and 3B each represent an input signal value.

Specifically, for example, the input signal values correspond to RGB signal values (e.g., 8- to 12-bit signal values).

The ordinate axes each represent a luminance value output to a display unit.

In the SDR image of (B), an output of the luminance value: 0 to 100 (cd/m$^2$) is obtained with respect to the input signal value (0 to about 1000).

On the other hand, in the HDR image of (A), an output of the luminance value: 0 to 1000 (cd/m$^2$) is obtained with respect to the input signal value (0 to about 1000). As described above, in the HDR image, an image output of about 10 times the luminance range of the SDR image becomes possible.

This shows that the HDR image is capable of exactly outputting from a darker range to a brighter range as an image close to an actual scene.

It should be noted that an HDR-supporting display apparatus needs to be used for outputting an HDR image.

The curve illustrated in the correspondence relationship graph of the input signal value and output luminance value of the HDR image in FIG. 3A is called SMPTE 2084 curve. This curve is a typical characteristics curve of the HDR image and is specified as an SMPTE (Society of Motion Picture and Television Engineers) standard.

It should be noted that the SMPTE 2084 curve is also called PQ (Perceptual Quantization) curve.

The PQ curve (=SMPTE 2084 curve) is used for generating encoded data corresponding to a dynamic range of a luminance range: 0 to 10000 cd/m$^2$ configuring an HDR image. Specifically, by converting the dynamic range of the luminance range configuring the HDR image according to the PQ curve (=SMPTE 2084 curve) defined as a curve of a quantization step matching the eyes of human beings, image signals within a predetermined bit (e.g., 10 to 12 bits) tone can be generated.

On the other hand, the curve illustrated in the correspondence relationship graph of the input signal value and output luminance value of the SDR image in FIG. 3B is called gamma 2.4 curve.

The gamma 2.4 curve is used for generating encoded data corresponding to a dynamic range of a luminance range: 0 to 120 cd/m$^2$ configuring an SDR image. Specifically, by converting the dynamic range of the luminance range configuring the SDR image according to the gamma 2.4 curve defined as a curve of the quantization step matching the eyes of human beings, image signals within a predetermined bit (e.g., 8 to 10 bits) tone can be generated.

3. REGARDING HDR IMAGE, SDR IMAGE, IMAGE CONTENT GENERATION, AND REPRODUCTION PROCESSING EXAMPLE

Next, descriptions will be given on the HDR image, the SDR image, image content generation, and a reproduction processing example.

First, generation of an HDR content including an HDR image and a reproduction processing example thereof will be described with reference to FIG. 4 and subsequent figures.

Figure 4:
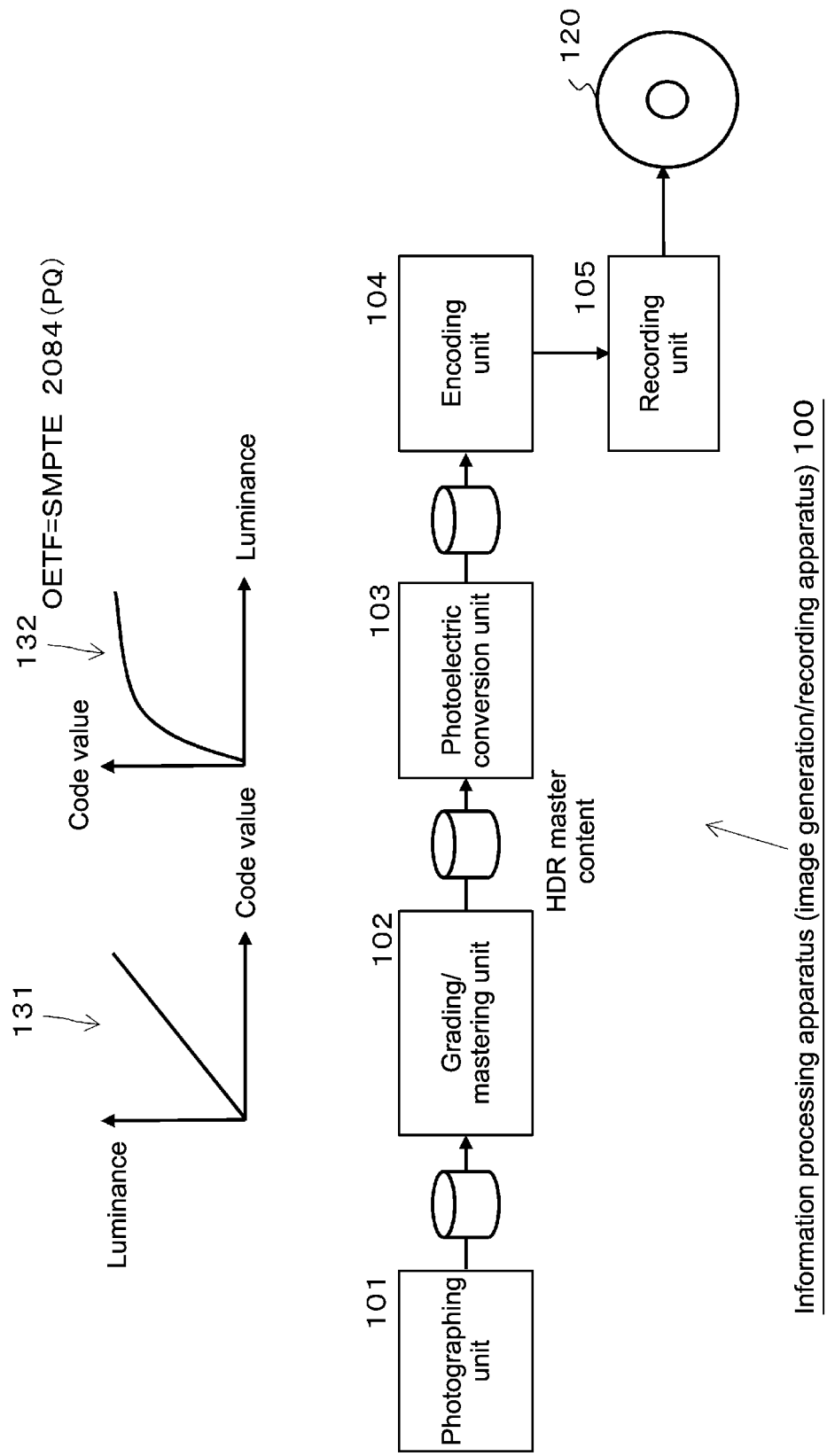
FIG. 4 is a diagram for explaining image generation processing and recording processing of HDR images.

FIG. 4 shows a configuration example of an information processing apparatus 100 that executes HDR content generation processing and recording processing.

A photographing unit 101 is equipped with, for example, a 4K camera, and records color images of a wide color gamut color system based on an ITU-R recommendation BT.2020. It should be noted that the ITU-R recommendation is a standard specified by ITU (International Telecommunication Union).

The wide color gamut color system based on the ITU-R recommendation BT.2020 will be described with reference to FIG. 5.

Figure 5:
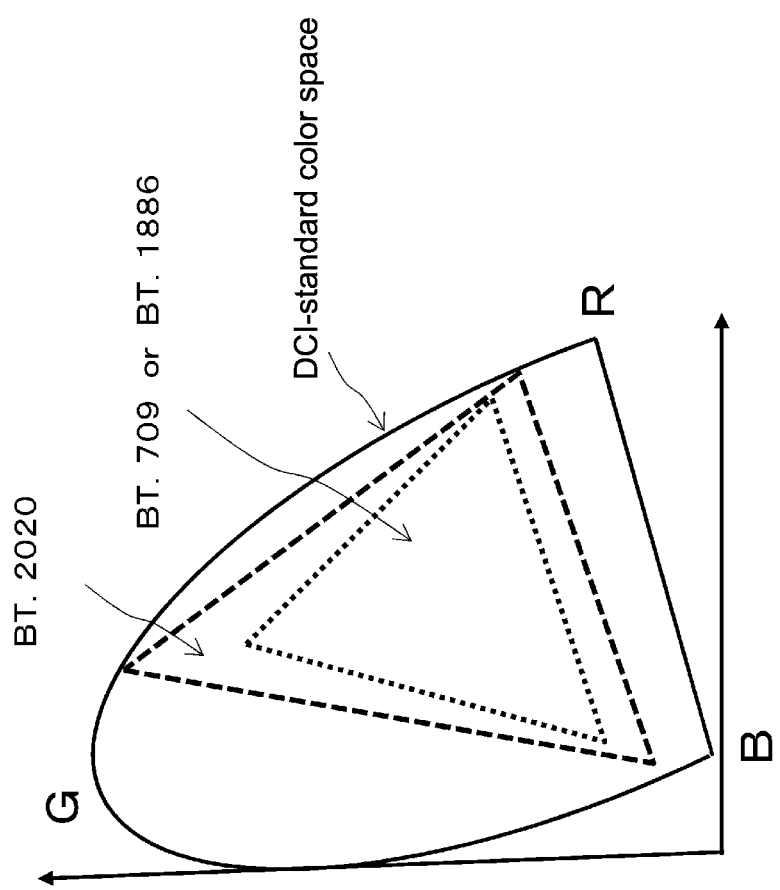
FIG. 5 is a diagram for explaining color spaces.

FIG. 5 is a diagram explaining a color gamut output to the display unit such as a television when an image content stored in, for example, a BD (Blu-ray (registered trademark) Disc), is displayed on the display unit, and shows a plurality of color systems specified in a DCI-standard color space.

An ITU-R BT.709 color system, an ITU-R BT.1886 color system, and an ITU-R BT.2020 color system that enables a wider color range to be expressed are illustrated.

Colors that can be output in the SDR image are colors within the space specified by ITU-R BT.709 or ITU-R BT.1886 shown in FIG. 5.

The SDR image is output as 8- to 10-bit signal values obtained by nonlinearly converting the luminance using, for example, an optical-electro transfer function (OETF: Optical-Electro Transfer Function) conforming to ITU-R BT.709 or ITU-R BT.1886.

On the other hand, colors that can be output in the HDR image are colors within the space specified by ITU-R BT.2020 shown in FIG. 5.

Colors outside the space specified by ITU-R BT.709 or ITU-R BT.1886 shown in FIG. 5 can also be output.

The HDR image is output as 10- to 12-bit signal values obtained by nonlinearly converting the luminance using, for example, an optical-electro transfer function (OETF: Optical-Electro Transfer Function) conforming to ITU-R BT.2020. Specifically, the HDR image is capable of outputting colors that cannot be expressed in the SDR image and is capable of expressing a wider color tone.

Referring back to FIG. 4, the configuration and processing of the information processing apparatus 100 that executes the HDR content generation processing and recording processing will be described.

As described above, the photographing unit 101 is equipped with, for example, a 4K camera, and records color images of a wide color gamut color system based on the ITU-R recommendation BT.2020.

Next, a grading/mastering unit 102 carries out grading or mastering processing on a photographed content and linearly converts code values and luminance using a conversion table 131, for example, to generate an HDR master content. Further, metadata corresponding to this HDR master content, such as metadata constituted of luminance information including a dynamic range and the like, color information, and the like, is generated.

Next, a photoelectric conversion unit 103 nonlinearly-converts the luminance into, for example, 10- to 12-bit code values using the optical-electro transfer function (OETF: Optical-Electro Transfer Function) as denoted by the reference numeral 132, and converts the optically-linear luminance signals of the HDR master content into display unit driving signals.

As the optical-electro transfer function (OETF), the SMPTE 2084 curve described above with reference to FIG. 3A is used. As described above, the SMPTE 2084 curve is also called PQ (Perceptual Quantization) curve and is used for generating encoded data corresponding to the dynamic range of the luminance range: 0 to 10000 $cd/m^2$ configuring the HDR image.

The SMPTE 2084 curve is a curve applied for generating, by converting the dynamic range of the luminance range configuring the HDR image according to the PQ curve (=SMPTE 2084 curve) defined as the curve of the quantization step matching the eyes of human beings, image signals within a predetermined bit (e.g., 10 to 12 bits) tone.

An encoding unit 104 encodes the HDR master content and metadata thereof and generates encoded data in a predetermined data format. The generated encoded data is recorded onto a recording medium 120 via a recording unit 105.

Figure 6:
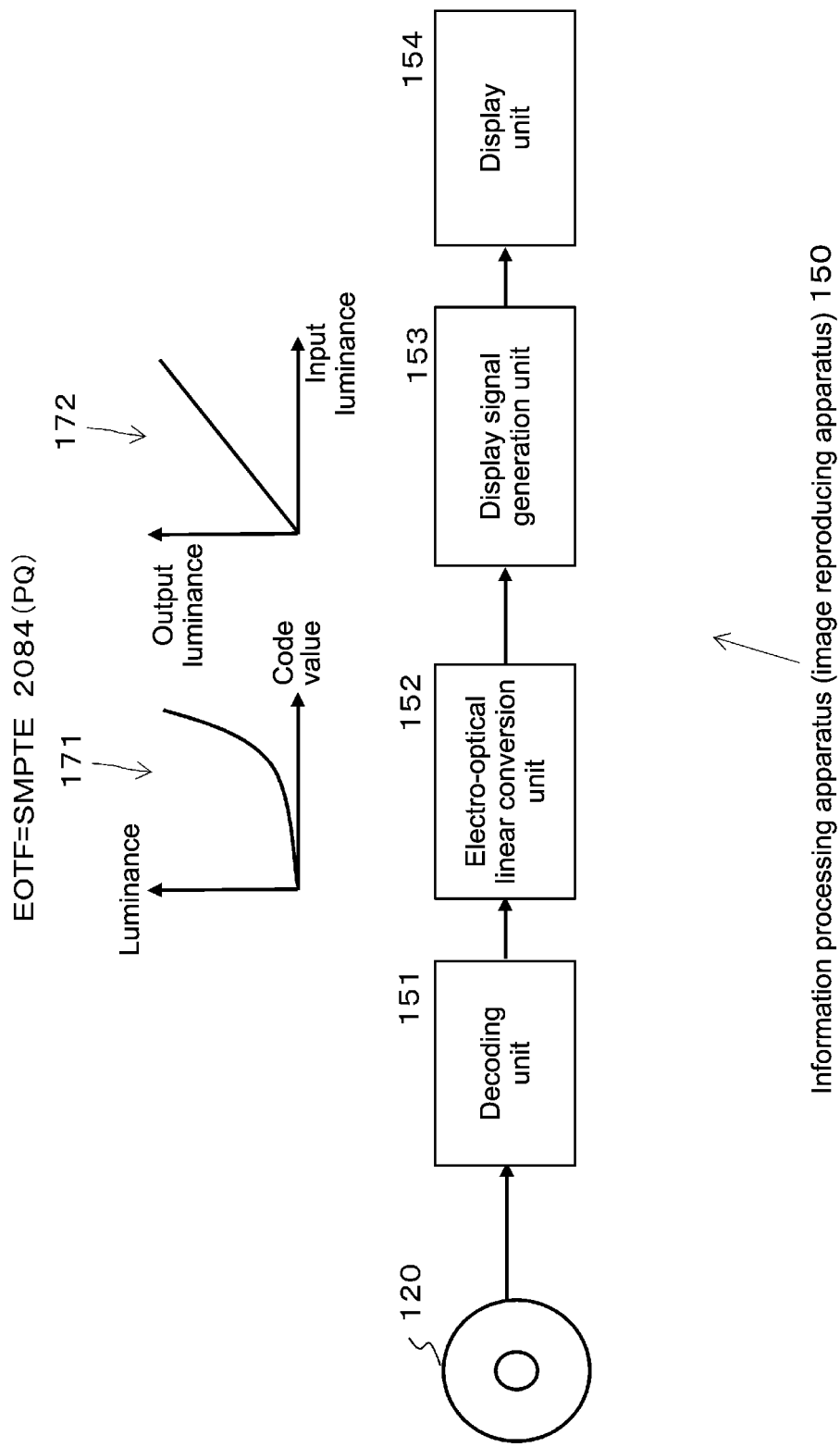
FIG. 6 is a diagram for explaining image reproduction processing of HDR images.

FIG. 6 is a diagram showing a configuration example of an information processing apparatus 150 as an image reproducing apparatus that reads out and reproduces HDR image data recorded onto the recording medium 120 in a predetermined data format.

A decoding unit 151 executes processing of decoding the encoded stream read out from the recording medium 120 into signals that can be output to the display apparatus (display unit driving signals) and also extracts metadata.

Next, an electro-optical linear conversion unit 152 converts the decoded display unit driving signals constituted of, for example, 10-bit code values, into optically-linear luminance signals using an electro-optical transfer function (EOTF: Electro-Optical Transfer Function) 171. For example, dynamic range conversion processing based on luminance information described in the metadata is carried out on the EOTF-converted optically-linear luminance signals.

In the processing of converting the code values into luminance signals, the electro-optical transfer function (EOTF) 171 corresponding to the SMPTE 2084 curve as an HDR-image-supporting signal-luminance correspondence curve that has been described above with reference to FIG. 3A is used.

Next, a display signal generation unit 153 uses a conversion table 172 to generate display unit driving signals corresponding to the characteristics of the display panel. In carrying out this processing, metadata acquired from the recording medium 120 and characteristics information acquired from a display unit 154 (output-enable dynamic range information, color information, etc.) are used.

The display unit 154 constituted of a liquid crystal display panel and the like displays a content based on the display unit driving signals generated by the display signal generation unit 153.

Figure 7:
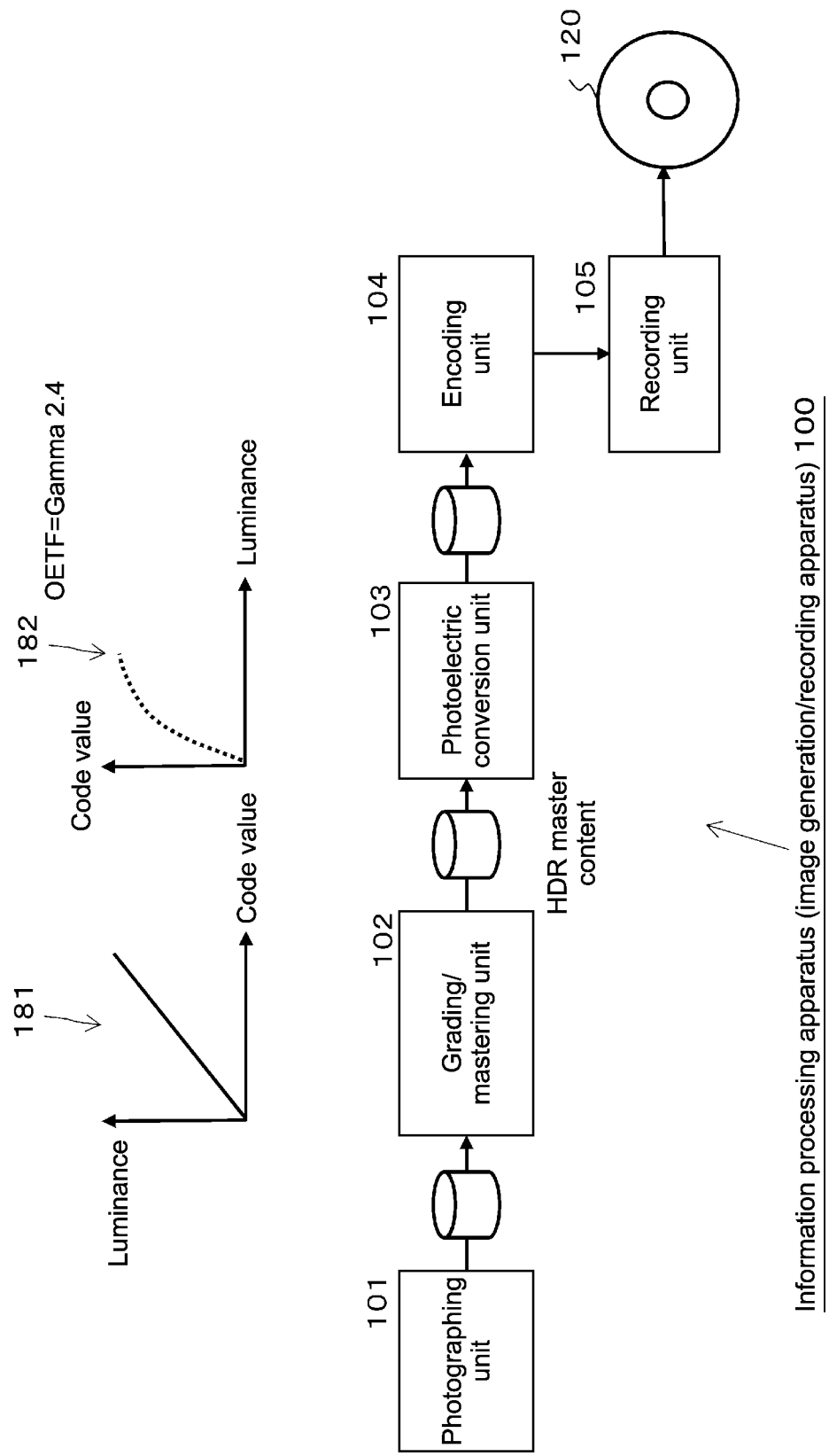
FIG. 7 is a diagram for explaining image generation processing and recording processing of SDR images.

FIG. 7 shows a configuration example of the information processing apparatus 100 that executes SDR content generation processing and recording processing.

The information processing apparatus 100 that executes the SDR content generation processing and recording processing has a block configuration similar to that of the information processing apparatus 100 that executes the HDR content generation processing and recording processing described above with reference to FIG. 4.

It should be noted that the photographing unit 101 records, instead of color images of the wide color gamut color system based on the ITU-R recommendation BT.2020, color images of a color system based on the ITU-R recommendation BT.709 or BT.1886 that has a slightly-narrower color system than BT.2020. The color system based on BT.709 or BT.1886 includes a slightly-narrower color system than BT.2020 as described above with reference to FIG. 5.

An image photographed by the photographing unit 101 is input to the grading/mastering unit 102, and grading or mastering processing is carried out on the photographed content. For example, code values and luminance are linearly-converted using a conversion table 181, to thus generate an SDR master content. Further, metadata corresponding to this SDR master content, such as metadata constituted of luminance information including a dynamic range and the like, color information, and the like is generated.

Next, the photoelectric conversion unit 103 nonlinearly-converts the luminance into, for example, 8- to 10-bit code values using the optical-electro transfer function (OETF: Optical-Electro Transfer Function) as denoted by the reference numeral 182, and converts the optically-linear luminance signals of the SDR master content into display unit driving signals.

In the HDR content generation and recording processing described above with reference to FIG. 4, the SMPTE 2084 curve described above with reference to FIG. 3A is used as this optical-electro transfer function (OETF).

On the other hand, in the SDR content recording processing, the gamma 2.4 curve described above with reference to FIG. 3B is used.

As described above with reference to FIG. 3, the gamma 2.4 curve is used for generating encoded data corresponding to the dynamic range of a luminance range: 0 to 120 $cd/m^2$ configuring an SDR image. Specifically, by converting the dynamic range of the luminance range configuring the SDR image according to the gamma 2.4 curve defined as a curve of the quantization step matching the eyes of human beings, image signals within a predetermined bit (e.g., 8 to 10 bits) tone can be generated.

The encoding unit 104 encodes the SDR master content and metadata thereof and generates encoded data in a predetermined data format. The generated encoded data is recorded onto the recording medium 120 via the recording unit 105.

Figure 8:
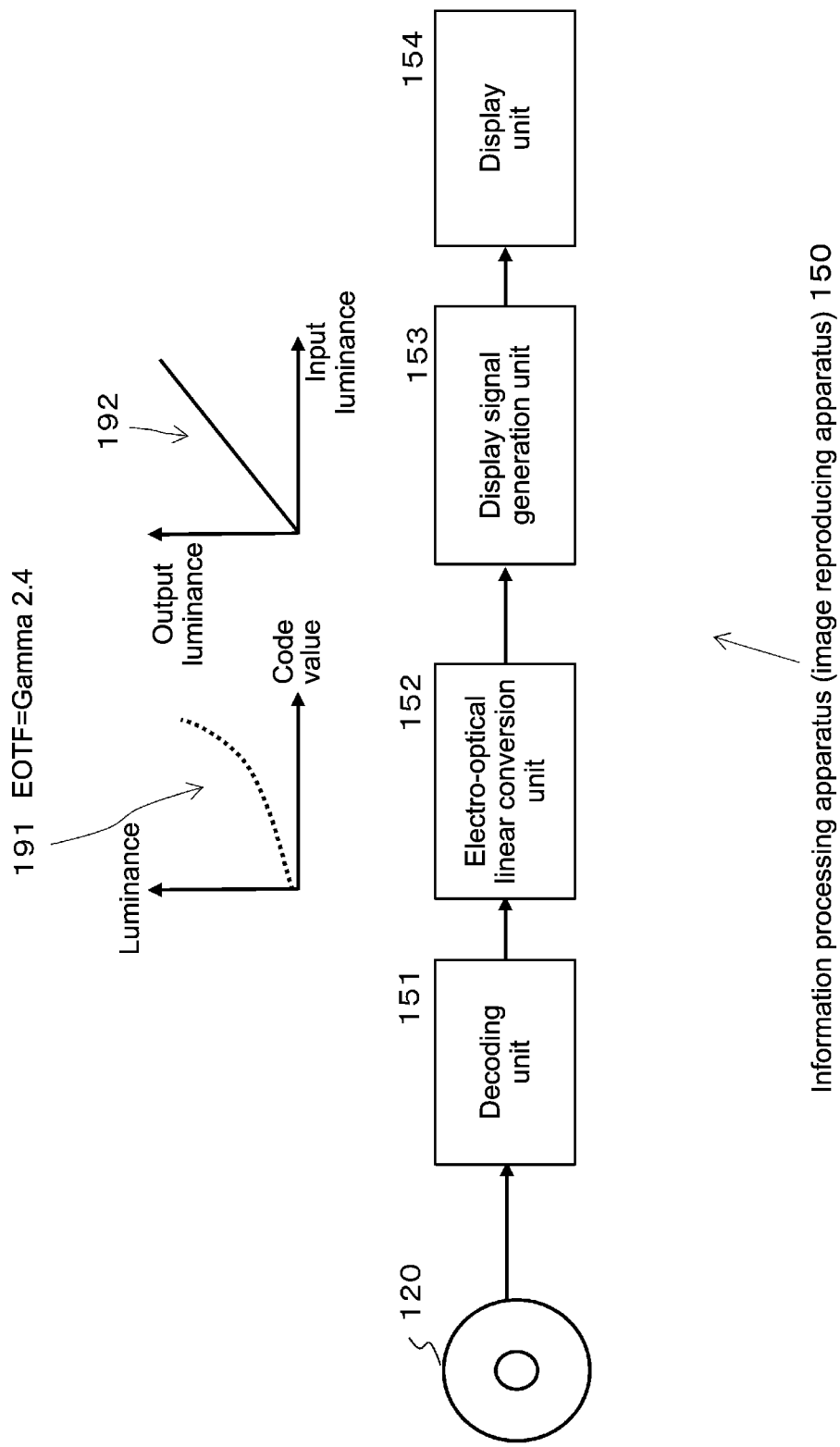
FIG. 8 is a diagram for explaining image reproduction processing of SDR images.

FIG. 8 is a diagram showing a configuration example of the information processing apparatus 150 as the image reproducing apparatus that reads out and reproduces SDR image data recorded onto the recording medium 120 in a predetermined data format.

The block configuration shown in FIG. 8 is also similar to that of the reproducing apparatus for HDR image data, that has been described above with reference to FIG. 6.

It should be noted that the electro-optical transfer function (EOTF: Electro-Optical Transfer Function) used in the electro-optical linear conversion unit 152 is replaced by an SDR-image-supporting electro-optical transfer function (EOTF) 191.

The decoding unit 151 executes processing of decoding the encoded stream read out from the recording medium 120 into signals that can be output to the display apparatus (display unit driving signals) and also extracts metadata.

Next, the electro-optical linear conversion unit 152 converts the decoded display unit driving signals constituted of, for example, 8- to 10-bit code values, into optically-linear luminance signals using the electro-optical transfer function (EOTF: Electro-Optical Transfer Function) 191. For example, the dynamic range conversion processing based on luminance information described in the metadata is carried out on the EOTF-converted optically-linear luminance signals.

In the processing of converting the code values into luminance signals, the electro-optical transfer function (EOTF) 191 corresponding to the gamma 2.4 curve as an SDR-image-supporting signal-luminance correspondence curve that has been described above with reference to FIG. 3B is used.

Next, the display signal generation unit 153 uses a conversion table 192 to generate display unit driving signals corresponding to the characteristics of the display panel. In carrying out this processing, metadata acquired from the recording medium 120 and characteristics information acquired from the display unit 154 (output-enable dynamic range information, color information, etc.) are used.

The display unit 154 constituted of a liquid crystal display panel and the like displays a content based on the display unit driving signals generated by the display signal generation unit 153.

4. REGARDING PROBLEMATIC POINTS IN PERFORMING SUPERIMPOSITION DISPLAY PROCESSING OF HDR IMAGE DATA AND SDR IMAGE DATA

The BD-ROM described above with reference to FIG. 1 stores various contents at the same time.

For example, various contents such as a menu screen, guide information, an animation image, and a user interface image are stored in addition to a movie content as the main content.

The reproducing apparatus sometimes carries out processing of superimposing a sub-content such as a menu screen on the main content and displaying it, and the like while reproducing a movie content as the main content.

Examples of the superimposition display of the main content and the sub-content will be described with reference to FIGS. 9 and 10.

Figure 9:
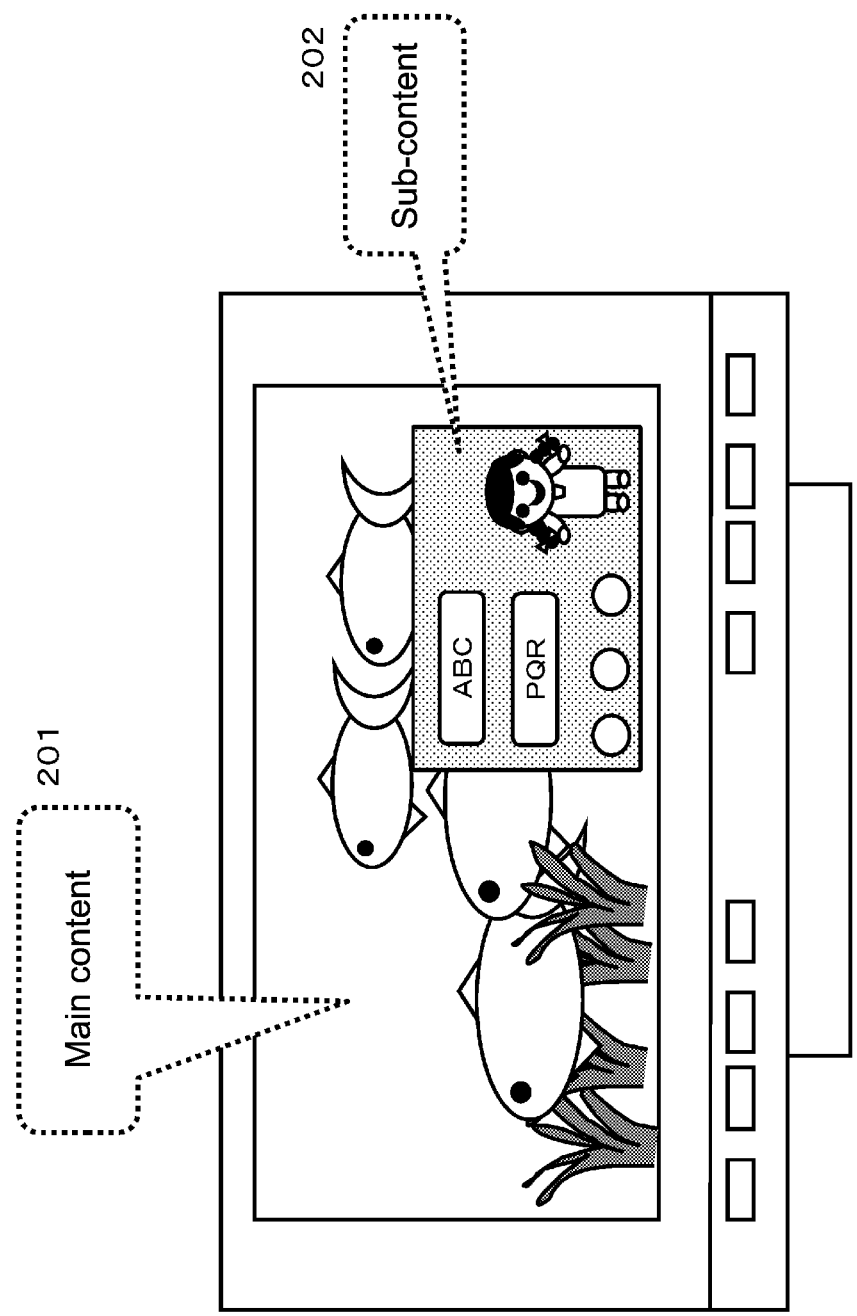
FIG. 9 is a diagram for explaining problematic points in superimposing a main content and a sub-content for display.

FIG. 9 shows an example of superimposing and displaying a sub-content 202 such as a menu screen and guide information on a partial area of a main content 201 such as a movie.

Figure 10:
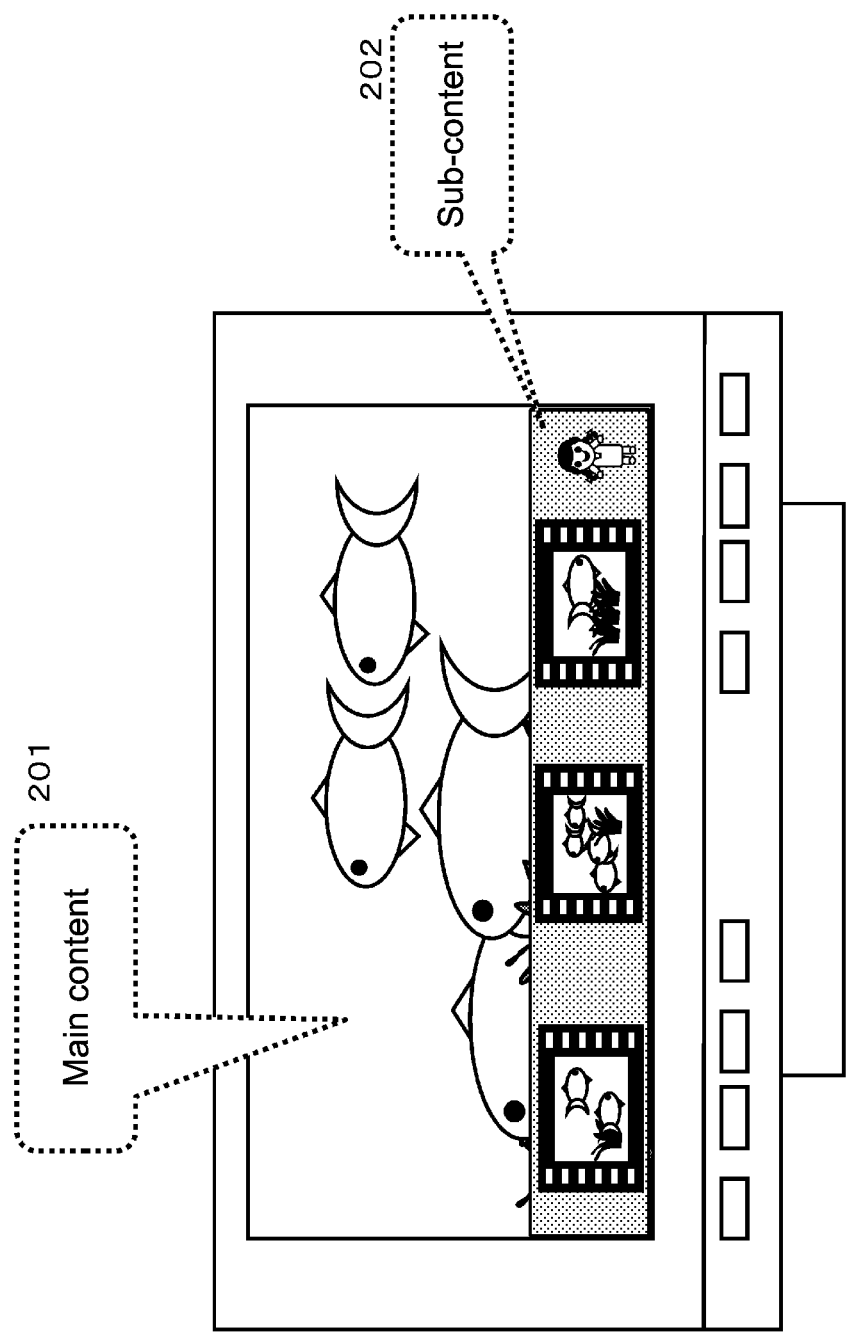
FIG. 10 is a diagram for explaining problematic points in superimposing a main content and a sub-content for display.

FIG. 10 shows an example of superimposing and displaying the sub-content 202 constituted of thumbnail images of a movie on a partial area of the main content 201 such as a movie.

The thumbnail images shown in the sub-content 202 are used by a user to designate a reproduction start position of a movie, or the like. Specifically, FIG. 10 shows an example of superimposing and displaying the sub-content 202 constituted of thumbnail images of scenes at random access points in a movie on the main content 101.

Various other types of sub-contents are displayed with the main content.

Subtitles, animations, and the like are also sub-contents to be superimposed and displayed on a main content in addition to the menu and thumbnails shown in FIGS. 9 and 10.

When a plurality of different contents are displayed on one screen as described above, there is a problem that, if one of the contents is an HDR image and the other is an SDR image, a subtle difference is caused in the color and luminance between the contents to thus give a feeling of strangeness to viewers.

As described above with reference to FIGS. 3 and 5, the color and luminance ranges that can be output totally differ between the HDR image and the SDR image. For example, as described above with reference to FIG. 5, the color range that can be output differs between the color system applied to HDR images (BT.2020) and the color system applied to SDR images (BT.709/BT.1886).

When the HDR image and the SDR image having totally different output characteristics as described above are output in parallel in that state, the viewers will sense a feeling of strangeness that is based on the difference between the two images.

As described above with reference to FIGS. 1 and 2, the BD-ROM or BD-UHD-ROM stores a clip AV stream to be reproduced according to control of the playlist, clip information file, and the like.

There are also contents to be reproduced using BD-J as a file that stores JAVA (registered trademark) programs, commands, and the like in addition to the clip AV stream.

Hereinafter, as an example, the main content will be described as a content included in a clip AV stream that is reproduced according to control of the clip information file and the like, and
the sub-content will be described as a content that is reproduced using BD-J.

It should be noted that various other combinations of the main content and sub-content can be set as in a case where the main content and the sub-content are both contents included in the clip AV stream, a case where the main content is a movie content and the sub-content is subtitle data, and the like.

Figure 11:
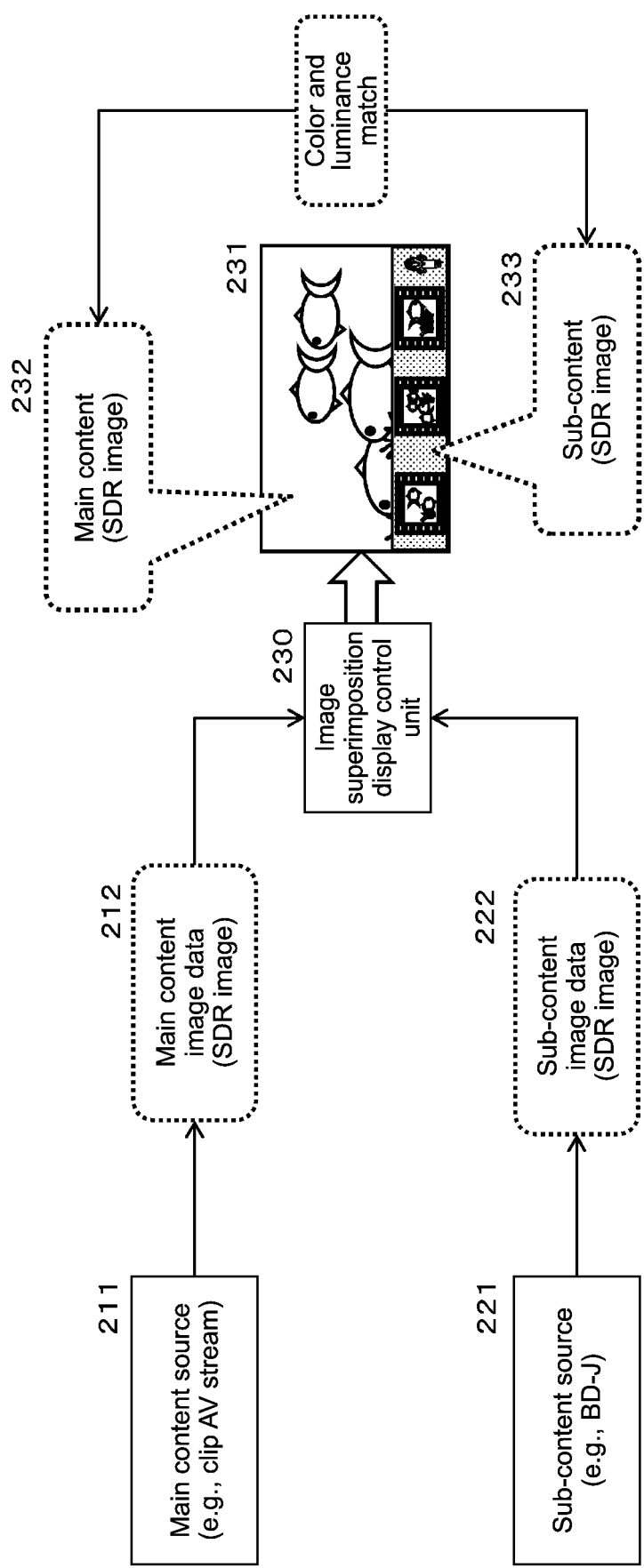
FIG. 11 is a diagram for explaining a configuration example and processing example of an apparatus that executes superimposition display processing of a main content and a sub-content.

With reference to FIG. 11 and subsequent figures, a plurality of processing examples in a case where a sub-content is superimposed and displayed on a main content will be described.

FIG. 11 shows a processing example in a case where the main content and the sub-content are both SDR images.

A main content source 211 is, for example, a clip AV stream file.

On the other hand, a sub-content source 221 is, for example, a BD-J file storing JAVA (registered trademark) programs. By executing a program stored in the BD-J file, for example, the sub-content constituted of a menu screen, thumbnail images, and the like, that has been described above with reference to FIGS. 9 and 10, is output.

Main content image data 212 is output from the main content source 211 as reproduction image data.

On the other hand, sub-content image data 222 is output from the sub-content source 221 as reproduction image data.

In the example shown in FIG. 11, the main content image data 212 and the sub-content image data 222 are both SDR images.

The main content image data 212 and the sub-content image data 222 are subjected to superimposition processing in an image superimposition display control unit 230 and displayed on the display unit.

A display image 231 shown in the figure is displayed on the display unit.

The display image 231 is an image in which a sub-content 233 as the SDR image is superimposed and displayed on a partial area of a main content 232 as the SDR image.

In the case of the example shown in FIG. 11, since the main content 232 and the sub-content 233 are both SDR images and the luminance ranges that can be output and used color spaces coincide, the color tones and luminance of the main content 232 and sub-content 233 coincide, with the result that the viewers observe the image as image data having a sense of unity without a feeling of strangeness.

Figure 12:
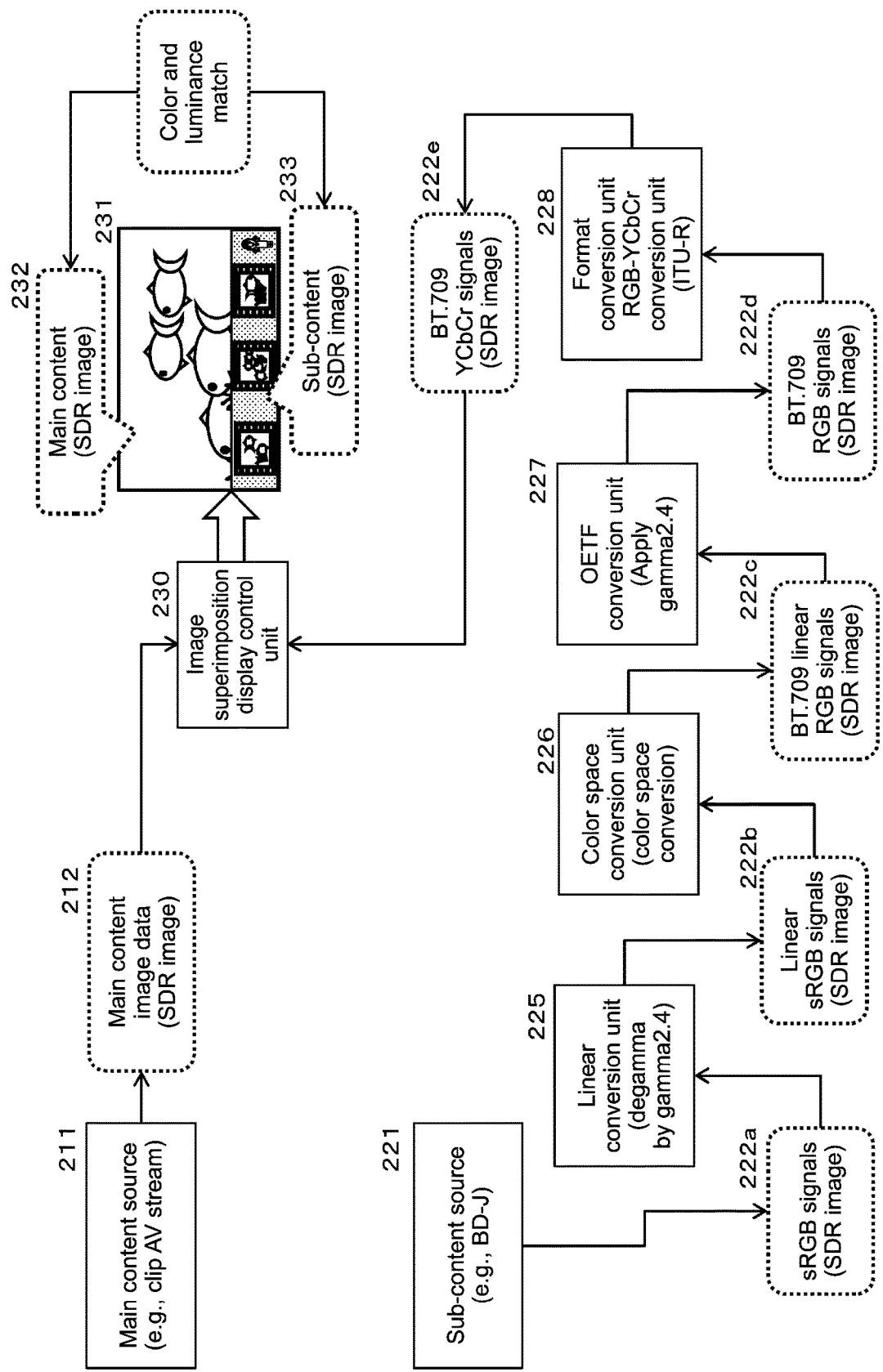
FIG. 12 is a diagram for explaining a configuration example and processing example of an apparatus that executes superimposition display processing of a main content and a sub-content.

FIG. 12 is a diagram showing a specific output image generation processing example of a sub-content in the case where the main content 232 and the sub-content 233 are both SDR images as described with reference to FIG. 11.

The main content image data 212 is output from the main content source 211 as reproduction image data.

On the other hand, sRGB signals 222a configuring an SDR image as sub-content image data is output to a linear conversion unit 225 from the sub-content source 221.

The sRGB signals 222a are signals conforming to one of the standards for RGB signal values, for example, a new RGB standard set for making output colors of displays and printers have a sense of unity. In the example shown in FIG. 12, the sub-content is an SDR image, and sRGB signals of 8-bit each for RGB are input to the linear conversion unit 225.

The sub-content output from the sub-content source 221 is an SDR image, and a correspondence relationship between the sRGB signal values of pixels and luminance in the SDR image becomes the relationship conforming to the gamma 2.4 curve shown in FIG. 3B.

The linear conversion unit 225 executes linear conversion processing of converting the correspondence relationship between the signal values and the luminance, that conforms to the gamma 2.4 curve, into a linear relationship, and generates linear sRGB signals 222b. Specifically, the correspondence relationship between the signal values and luminance is converted into a linear relationship by de-gamma processing to which the gamma 2.4 curve is applied. The linear conversion processing is carried out as preprocessing for carrying out color space conversion processing.

The linear sRGB signals 222b generated by the linear conversion unit 225 are input to a color space conversion unit 226.

The sub-content output from the sub-content source 221 is an SDR image, and pixel values in a color space defined by the sRGB values are set. The pixel values are converted into colors of the BT.709 color space that has been described above with reference to FIG. 5.

It should be noted that there are various methods for the color space conversion processing. For example, a matrix conversion to which a matrix set with predetermined conversion parameters is applied, or the like is used. It should be noted that the colors obtained after the conversion differ depending on the applied method in the color space conversion processing.

The color space conversion unit 226 inputs BT.709 linear RGB signals 222c generated by the color space conversion to an OETF conversion unit (photoelectric conversion unit) 227.

The OETF conversion unit (photoelectric conversion unit) 227 executes OETF conversion (photoelectric conversion) processing on the BT.709 linear RGB signals 222c whose signal-luminance correspondence relationship is a linear relationship and generates BT.709 RGB signals 222d.

In the OETF conversion processing of the OETF conversion unit (photoelectric conversion unit) 227, the signal-luminance correspondence relationship curve corresponding to the SDR image, that has been described above with reference to FIG. 3B, that is, the gamma 2.4 curve is used.

The OETF conversion unit (photoelectric conversion unit) 227 outputs the BT.709 RGB signals 222d generated by the photoelectric conversion processing to which the gamma 2.4 curve is applied, to a format conversion unit 228.

The BT.709 RGB signals 222d are SDR signals whose input/output characteristics (signal-luminance characteristics) conform to the gamma 2.4 curve shown in FIG. 3B.

The format conversion unit 228 inputs the BT.709 RGB signals 222d and subjects the signals to a format conversion, to generate BT.709 YCbCr signals 222e constituted of YCbCr signals.

This format conversion between the RGB-YCbCr signals is carried out according to an ITU-R conversion rule. For example, using an ITU-R conversion table that records a correspondence relationship between the RGB signal values and the YCbCr signal values, the RGB signal values are converted into YCbCr signal values. This format conversion is similarly carried out in all apparatuses since the format conversion is executed according to one rule (specified rule of ITU-R).

The BT.709 YCbCr signals 222e generated by the format conversion unit 228 are input to the image superimposition display control unit 230.

The image superimposition display control unit 230 inputs the main content image data 212 output from the main content source 211 and the BT.709 YCbCr signals 222e generated by the format conversion unit 228 and executes superimposition processing on those images to generate output image data with respect to the display unit.

It should be noted that the main content image data 212 output from the main content source 211 and the BT.709 YCbCr signals 222e that are based on image data output from the sub-content source 221 are both SDR images.

The display image 231 shown in the figure is displayed on the display unit.

The display image 231 becomes an image in which the sub-content 233 as the SDR image is superimposed and displayed on a partial area of the main content 232 as the SDR image.

In the case of the example shown in FIG. 12, the main content 232 and the sub-content 233 are both SDR images, and an image having a sense of unity without a difference in the color and luminance levels between the contents is obtained.

Figure 13:
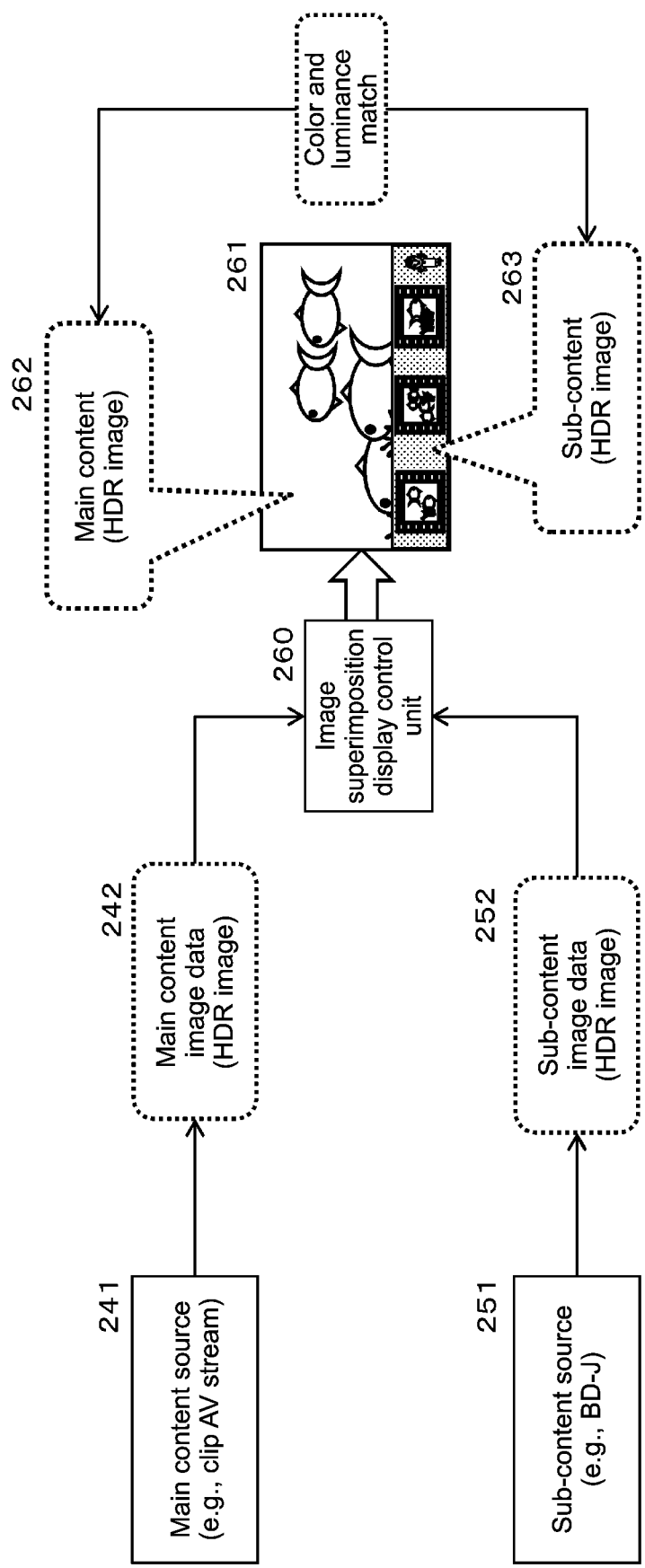
FIG. 13 is a diagram for explaining a configuration example and processing example of the apparatus that executes the superimposition display processing of a main content and a sub-content.

FIG. 13 shows a processing example in a case where the main content and the sub-content are both HDR images.

Main content image data 242 is output from a main content source 241 as reproduction image data.

On the other hand, sub-content image data 252 is output from a sub-content source 251 as reproduction image data.

In the example shown in FIG. 13, the main content image data 242 and the sub-content image data 252 are both HDR images.

Those pieces of image data are subjected to superimposition processing in an image superimposition display control unit 260 and displayed on the display unit. A display image 261 shown in the figure is displayed on the display unit.

The display image 261 is an image in which a sub-content 263 as the HDR image is superimposed and displayed on a partial area of a main content 262 as the HDR image.

In the case of the example shown in FIG. 13, since the main content 262 and the sub-content 263 are both HDR images and the luminance ranges that can be output and used color spaces coincide, the color tones and luminance of the main content 262 and sub-content 263 coincide, with the result that the viewers observe the image as image data having a sense of unity without a feeling of strangeness.

Figure 14:
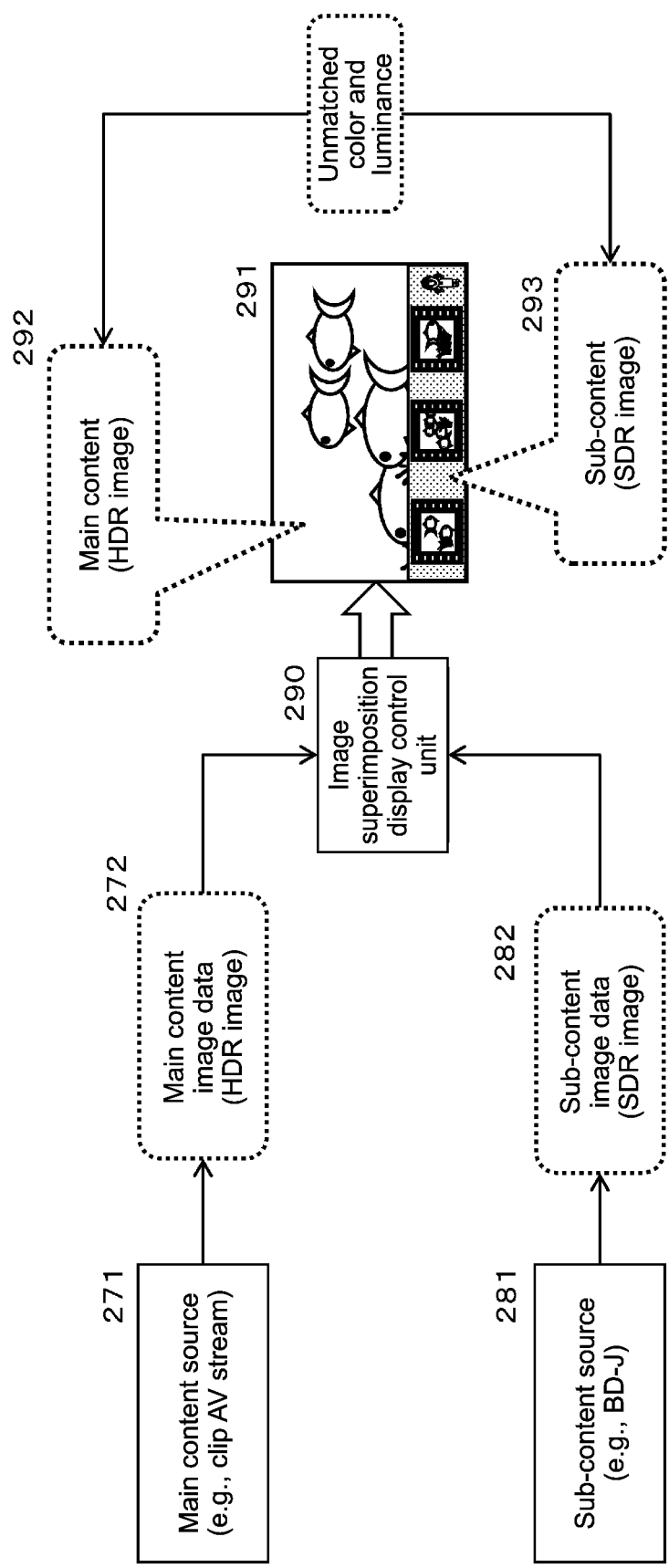
FIG. 14 is a diagram for explaining a configuration example and processing example of the apparatus that executes the superimposition display processing of a main content and a sub-content.

FIG. 14 shows a processing example in a case where the main content is an HDR image and the sub-content is an SDR image.

Main content image data 272 is output from a main content source 271 as reproduction image data.

On the other hand, sub-content image data 282 is output from a sub-content source 281 as reproduction image data.

In the example shown in FIG. 14, the main content image data 272 is an HDR image, and the sub-content image data 282 is an SDR image.

Those pieces of image data are subjected to superimposition processing in an image superimposition display control unit 290 and displayed on the display unit. A display image 291 shown in the figure is displayed on the display unit.

The display image 291 is an image in which a sub-content 293 as the SDR image is superimposed and displayed on a partial area of a main content 292 as the HDR image.

In the case of the example shown in FIG. 14, the main content 292 is the HDR image, and the sub-content 293 is the SDR image.

As described above with reference to FIG. 3, the luminance range that can be output totally differs between the HDR image and the SDR image.

Further, as described above with reference to FIG. 5, the color range that can be output differs between the color system applied to HDR images (BT.2020) and the color system applied to SDR images (BT.709/BT.1886).

When the HDR image and the SDR image having totally different output characteristics as described above are output in parallel in that state, the viewers will sense a feeling of strangeness that is based on the difference between the two images.

As a method of suppressing such a feeling of strangeness, there is a method of executing, when the main content is an HDR image and the sub-content is an SDR image, an image conversion on the SDR image as the sub-content to generate a pseudo-HDR image, and outputting it.

The configuration example for executing this image conversion will be described with reference to FIG. 15.

Figure 15:
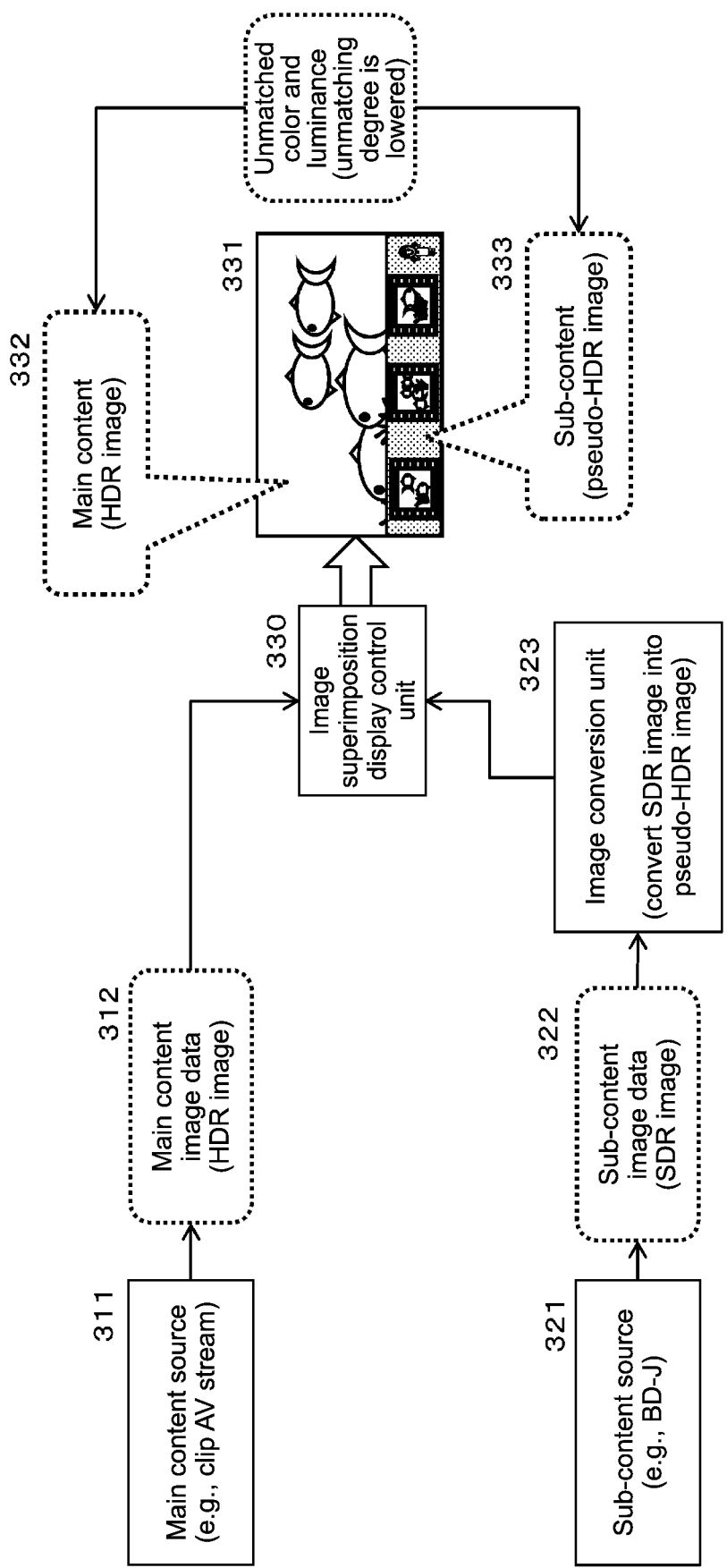
FIG. 15 is a diagram for explaining a configuration example and processing example of the apparatus that executes the superimposition display processing of a main content and a sub-content.

As in the case of the example shown in FIG. 14, FIG. 15 shows a processing example in the case where the main content is an HDR image and the sub-content is an SDR image.

Main content image data 312 is output from a main content source 311 as reproduction image data.

On the other hand, sub-content image data 322 is output from a sub-content source 321 as reproduction image data.

In the example shown in FIG. 15, the main content image data 312 is an HDR image, and the sub-content image data 322 is an SDR image.

The sub-content image data 322 as the SDR image is input to an image conversion unit 323.

The image conversion unit 323 carries out processing of converting the sub-content image data 322 as the SDR image into a pseudo-HDR image.

However, since the sub-content image data 322 as the SDR image lacks luminance level information and color information requisite as an HDR image, a complete HDR image cannot be generated. It only means that a pseudo-HDR image will be generated.

Processing of generating this pseudo-HDR image will be described later in detail.

The sub-content as the pseudo-HDR image generated by the image conversion unit 323 and the main content 312 as the real HDR image are subjected to superimposition processing in an image superimposition display control unit 330 and displayed on the display unit.

A display image 331 shown in the figure is displayed on the display unit.

The display image 331 is an image in which the sub-content 333 as the pseudo-HDR image is superimposed and displayed in a partial area of the main content 332 as the HDR image.

In the case of the example shown in FIG. 15, the main content 332 is the HDR image, and the sub-content 333 is the pseudo-HDR image.

By performing the image conversion as described above, the differences between the images lessens as compared to the combination of the HDR image and SDR image shown in FIG. 14.

However, the pseudo-HDR image generated by the image conversion differs from the real HDR image and thus gives viewers a feeling of strangeness based on the difference between the two images.

Figure 16:
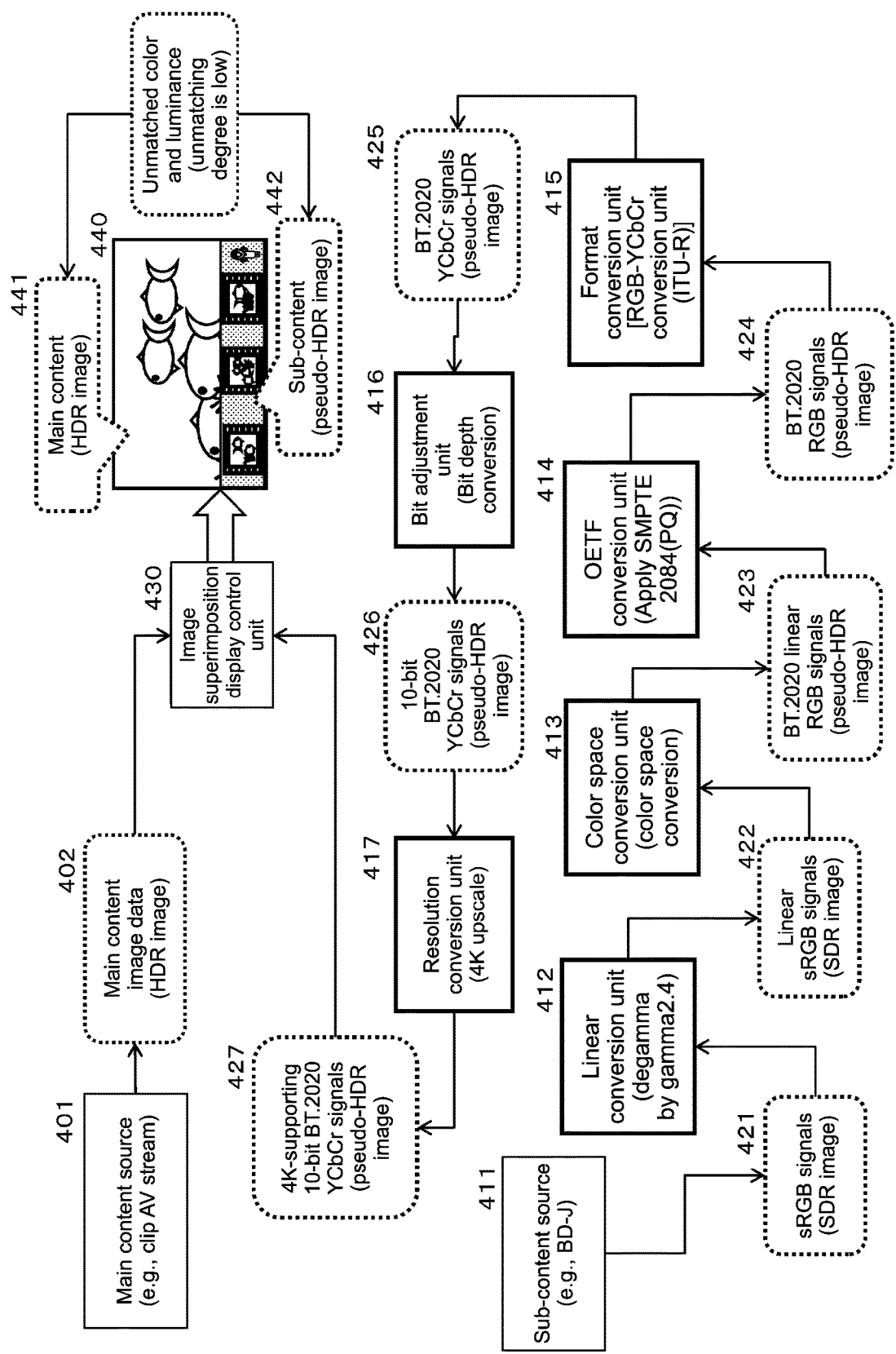
FIG. 16 is a diagram for explaining a configuration example and processing example of the apparatus that executes the superimposition display processing of a main content and a sub-content.

FIG. 16 is a diagram showing a specific configuration of the conversion processing from an SDR image to a pseudo-HDR image that has been described above with reference to FIG. 15.

The figure shows a processing example in a case where the main content is an HDR image and the sub-content is an SDR image.

Main content image data 402 is output from a main content source 401 as reproduction image data.

On the other hand, sRGB signals 421 configuring an SDR image as the sub-content image data are output from a sub-content source 411 to a linear conversion unit 412.

The sRGB signals 421 are signals conforming to one of the standards for RGB signal values, for example, a new RGB standard set for making output colors of displays and printers have a sense of unity. In the example shown in FIG. 16, the sub-content is an SDR image, and sRGB signals of 8-bit each for RGB are input to the linear conversion unit 412.

The sub-content output from the sub-content source 411 is the SDR image, and a correspondence relationship between the sRGB signal values of pixels and luminance in the SDR image becomes the relationship conforming to the gamma 2.4 curve shown in FIG. 3B.

The linear conversion unit 412 executes linear conversion processing of converting the correspondence relationship between the signal values and the luminance, that conforms to the gamma 2.4 curve, into a linear relationship, and generates linear sRGB signals 422. Specifically, the correspondence relationship between the signal values and luminance is converted into a linear relationship by the de-gamma processing to which the gamma 2.4 curve is applied. The linear conversion processing is carried out as preprocessing for carrying out the color space conversion processing.

The linear sRGB signals 422 generated by the linear conversion unit 412 are input to a color space conversion unit 413.

The sub-content output from the sub-content source 411 is an SDR image, and pixel values corresponding to the RGB color space are set. The color space conversion unit 413 carries out processing of converting the image configured by the color values within the RGB color space into an HDR-supporting color space (BT.2020).

It should be noted that there are various methods for the color space conversion processing. For example, a matrix conversion to which a matrix set with predetermined conversion parameters is applied, or the like is used. It should be noted that the colors obtained after the conversion differ depending on the applied method in the color space conversion processing.

The color space conversion unit 413 converts the SDR-image-supporting color space (BT.709 or BT.1886) into the HDR-image-supporting color space (BT.2020) to generate BT.2020 linear RGB signals 423, and inputs the BT.2020 linear RGB signals 423 to an OETF conversion unit (photoelectric conversion unit) 414.

It should be noted that the BT.2020 linear RGB signals 423 generated by the color space conversion unit 413 include color information of the HDR-image-supporting color space and thus become a pseudo-HDR image.

The BT.2020 linear RGB signals 423 generated by the color space conversion unit 413 are input to the OETF conversion unit (photoelectric conversion unit) 414.

The OETF conversion unit (photoelectric conversion unit) 414 executes the OETF conversion (photoelectric conversion) processing on the BT.2020 linear RGB signals 423 whose signal-luminance correspondence relationship is a linear relationship and thus generates BT.2020 RGB signals 424.

The OETF conversion processing by the OETF conversion unit (photoelectric conversion unit) 414 uses the HDR-image-supporting signal-luminance correspondence relationship curve that has been described above with reference to FIG. 3A, that is, the SMPTE 2084 curve.

As described above, the SMPTE 2084 curve is a curve used for generating encoded data corresponding to the dynamic range of a luminance range: 0 to 10000 cd/m2 configuring an HDR image.

The OETF conversion unit (photoelectric conversion unit) 414 outputs the BT.2020 RGB signals 424 generated by the photoelectric conversion processing to which the SMPTE 2084 curve is applied to a format conversion unit 415.

The BT.2020 RGB signals 424 are pseudo-HDR signals whose input/output characteristics (signal-luminance characteristics) conform to the SMPTE 2084 curve shown in FIG. 3A.

The format conversion unit 415 inputs the BT.2020 RGB signals 424 and subjects them to the format conversion to generate BT.2020 YCbCr signals 425 constituted of YCbCr signals.

This format conversion between the RGB-YCbCr signals is carried out according to the ITU-R conversion rule. For example, using the ITU-R conversion table that records the correspondence relationship between the RGB signal values and the YCbCr signal values, the RGB signal values are converted into YCbCr signal values. This format conversion is similarly carried out in all apparatuses since the format conversion is executed according to one rule (specified rule of ITU-R).

The BT.2020 YCbCr signals 425 generated by the format conversion unit 415 are input to a bit adjustment unit 416.

For example, SDR image is configured by 8-bit signal values, and the HDR image is configured by 10-bit signal values.

The BT.2020 YCbCr signals 425 generated by the format conversion unit 415 constitute a pseudo-HDR image, but when a bit width of each of the RGB signal values of the original SDR image is 8 bits, the YCbCr signal values of the BT.2020 YCbCr signals 425 are also set as 8 bits each.

The bit adjustment unit 416 extends the 8-bit signals to 10 bits and generates 10-bit BT.2020 YCbCr signals 426.

The 10-bit BT.2020 YCbCr signals 426 generated by the bit adjustment unit 416 are input to a resolution conversion unit 417.

The resolution conversion unit 417 executes resolution conversion processing of causing the output image to match the resolution of the display unit (4K).

Since the original sub-content is an SDR image and also a 2K image, processing of executing the resolution conversion (2K→4K) to cause a resolution to match the resolution of the display unit is executed.

The resolution conversion unit 417 executes the resolution conversion processing of causing the resolution to match that of the display unit (4K) on the 10-bit BT.2020 YCbCr signals 426 and generates 4K-supporting 10-bit BT.2020 YCbCr signals 427.

The 4K-supporting 10-bit BT.2020 YCbCr signals 427 generated by the resolution conversion unit 417 are input to an image superimposition display control unit 430.

The image superimposition display control unit 430 inputs the main content image data 402 output from the main content source 401 and the 4K-supporting 10-bit BT.2020 YCbCr signals 427 generated by the resolution conversion unit 417 and subjects them to the superimposition processing of those images, to generate output image data with respect to the display unit.

It should be noted that the main content image data 402 output from the main content source 401 is a real HDR image.

In contrast, the 4K-supporting 10-bit BT.2020 YCbCr signals 427 generated by the resolution conversion unit 427 constitute a pseudo-HDR image generated by the image conversion based on the SDR image.

In other words, the sub-content as the pseudo-HDR image and the main content as the real HDR image are subjected to the superimposition processing by the image superimposition display control unit 430 and displayed on the display unit.

A display image 440 shown in the figure is displayed on the display unit.

The display image 440 becomes an image in which the sub-content 442 as the pseudo-HDR image is superimposed and displayed on a partial area of the main content 441 as the HDR image.

In the case of the example shown in FIG. 16, the main content 441 is the real HDR image, and the sub-content 442 is the pseudo-HDR image.

As described above, the pseudo-HDR image generated by the image conversion differs from the real HDR image and thus gives viewers a feeling of strangeness based on the difference between the two images.

Further, as described above with reference to FIG. 16, the plurality of processing such as the linear conversion, color space conversion, and OETF conversion need to be executed successively for generating a pseudo-HDR image from an SDR image, thus resulting in a problem that processing loads and processing times become large/long.

5. PROCESSING EXAMPLE OF OUTPUTTING SUPERIMPOSED IMAGE OF PLURALITY OF CONTENTS AS IMAGE HAVING SENSE OF UNITY

Next, a processing example of outputting a superimposed image of a plurality of contents as an image having a sense of unity will be described.

As described above, when the main content and the sub-content are a combination of an HDR image content and an SDR image content, even when a pseudo-HDR image content is generated by executing the image conversion processing such as color space conversion on the SDR image content, a color tone and luminance different from those of the original HDR image content may be set.

When the pseudo-HDR image generated based on such an SDR image content and the real HDR image are displayed on the display unit in parallel, there is a fear that the difference between the two images will be recognized to thus give the viewers a feeling of strangeness.

Further, as described above with reference to FIG. 16, the plurality of processing such as the linear conversion, color space conversion, and OETF conversion need to be executed successively for generating a pseudo-HDR image from an SDR image, thus resulting in a problem that processing loads and processing times become large/long.

Hereinafter, a processing example that solves the problem as described above by outputting a superimposed image of a plurality of contents as an image having a sense of unity will be described.

In this embodiment, a processing example of superimposing and displaying a main content and a sub-content on the display unit as in the examples described above with reference to FIGS. 15 and 16 will be described.

Figure 17:
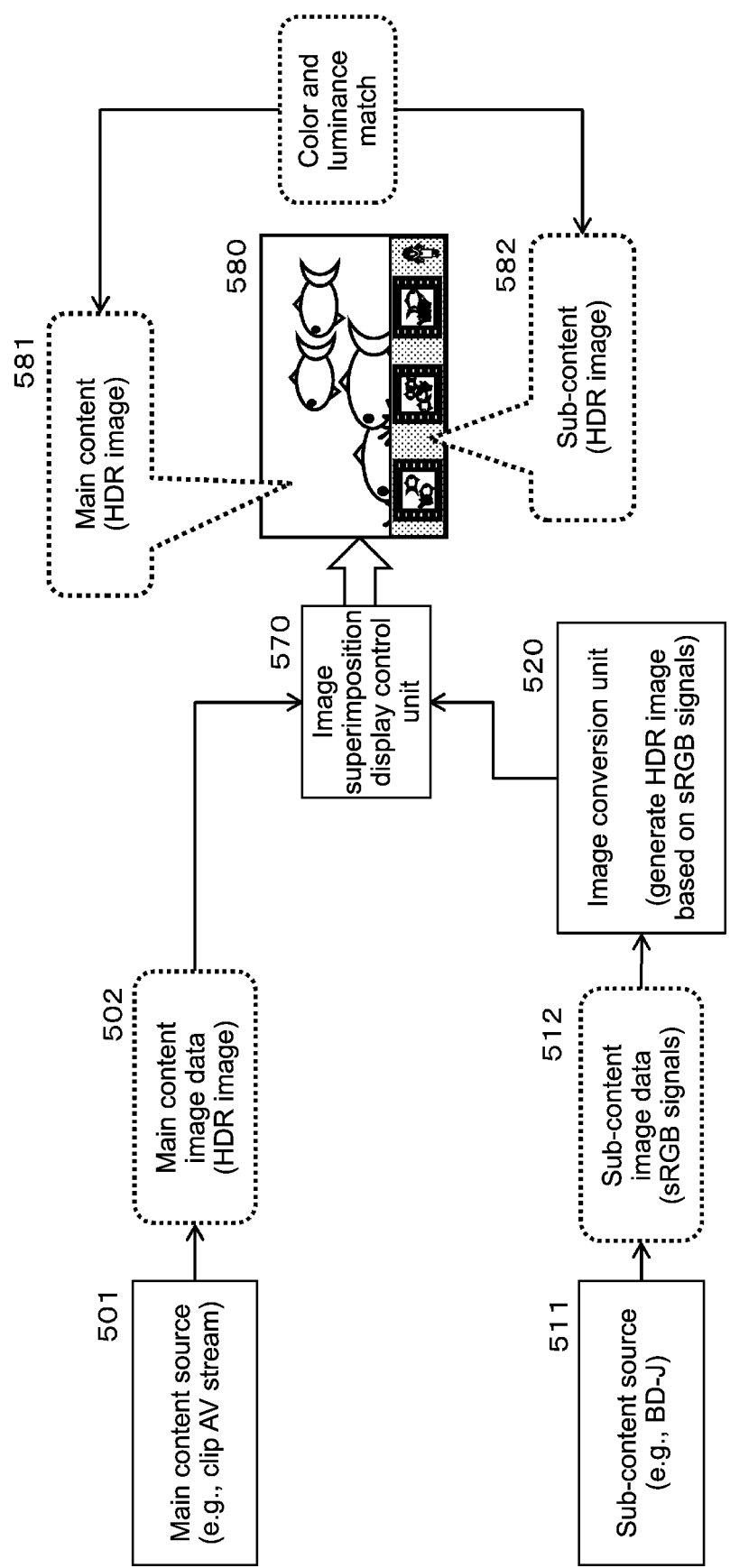
FIG. 17 is a diagram for explaining a configuration example and processing example of the apparatus that executes the superimposition display processing of a main content and a sub-content.

In this embodiment, when main content image data 502 output from a main content source 501 is an HDR image as shown in FIG. 17, sub-content image data 512 output from a sub-content source 511 is set as image data configured by RGB values (sRGB values) with which an HDR image can be output by subsequent processing by an image conversion unit 520.

With the setting as described above, a main content 581 and a sub-content 582 included in a display image 580 as a superimposed image generated by an image superimposition display unit 570 are both displayed as HDR images, and an image output having matched colors and luminance and a sense of unity becomes possible.

Figure 18:
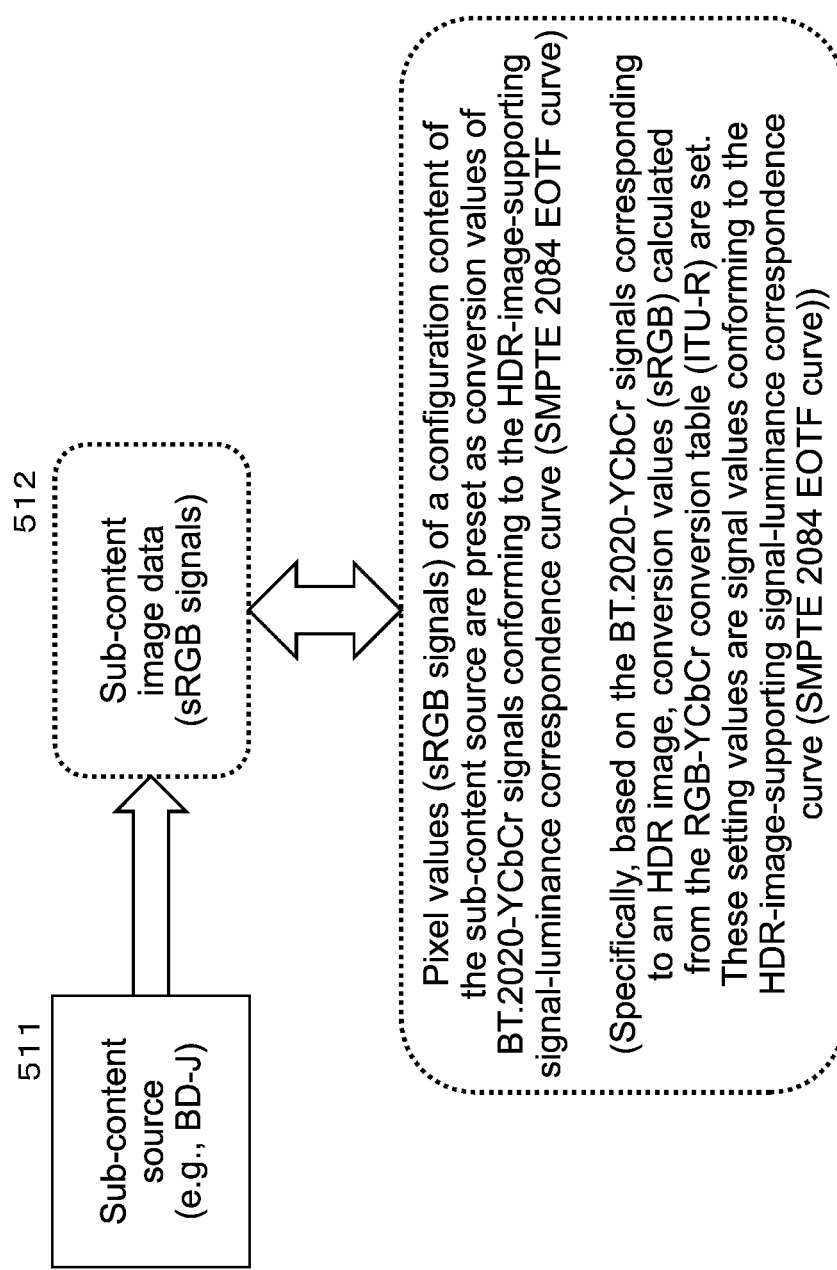
FIG. 18 is a diagram for explaining a setting example of constituent pixel values of a sub-content.

Specifically, the sub-content generated by the sub-content source 511 is set as image data configured by sRGB values as that shown in FIG. 18.

In other words, as shown in FIG. 18, pixel values (sRGB signals) of the sub-content image data 512 generated by or output from the sub-content source 511 such as BD-J are preset as conversion values of BT.2020-YCbCr signals conforming to the HDR-image-supporting signal-luminance correspondence curve (SMPTE 2084 EOTF curve).

Specifically, based on the BT.2020-YCbCr signals corresponding to an HDR image, RGB values (sRGB) as conversion values calculated from the RGB-YCbCr conversion table (ITU-R) are set. The setting values are signal values conforming to the HDR-image-supporting signal-luminance correspondence curve (SMPTE 2084 EOTF curve).

By setting the output content of the sub-content source 511 to be image data configured by the sRGB values set as described above, the linear conversion unit 412, the color space conversion unit 413, the OETF conversion unit 414, and the processing carried out by those units, that have been described above with reference to FIG. 16, can all be omitted.

In other words, the sRGB signals output from the sub-content source 511 can be directly input to the format conversion unit 415 shown in FIG. 16 so as to be converted into YCbCr signals conforming to a specified format conversion rule (ITU-R). The YCbCr signals obtained after the conversion become YCbCr signals in the BT.2020 color space as the HDR-image-supporting color space.

Since the sRGB-YCbCr format conversion is executed according to one specified conversion rule, that is, with use of a conversion table specified in ITU-R and the like, the same conversion processing can be executed in all apparatuses and the processing does not differ depending on the apparatus, with the result that YCbCr signals corresponding to a uniform HDR image can be generated.

After the format conversion by the format conversion unit, processing similar to that shown in FIG. 16 is executed. After executing the bit count adjustment by the bit adjustment unit 416 and the resolution conversion by the resolution conversion unit 417, the image superimposition display control unit 430 executes superimposition processing with respect to the main content.

The image output to the display unit by the processing as described above becomes an image that has a sense of unity without a feeling of strangeness since the main content and the sub-content are both displayed as HDR images.

For realizing the processing as described above, the signal values of the sub-content image data need to be set to special signal values that have been described above with reference to FIG. 18.

Specifically, conversion values (sRGB) calculated based on the RGB-YCbCr conversion table (ITU-R) need to be set based on the BT.2020-YCbCr signals applied to the output.

An example of a generation sequence of a sub-content having the special signal values will be described with reference to the flow shown in FIG. 19.

Figure 19:
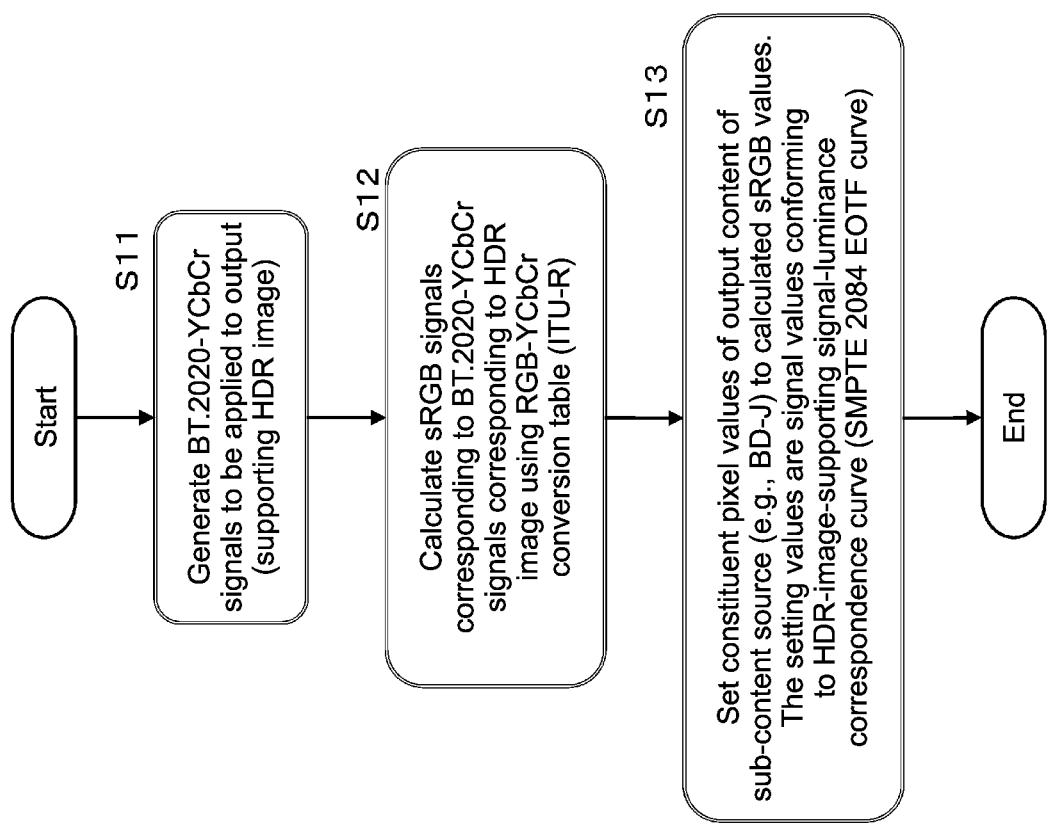
FIG. 19 is a diagram showing a flowchart for explaining a setting sequence of the constituent pixel values of a sub-content.

The processing shown in the flowchart of FIG. 19 is executed in the information processing apparatus as a sub-content generation apparatus.

Hereinafter, the processing of each step will be described.
(Step S11)

First, BT.2020-YCbCr signals (HDR-image-supporting) corresponding to an HDR image similar to an output image are generated.

Specifically, the YCbCr signal values as constituent pixel values of a sub-content image that is to become an output image are calculated as YCbCr signal values in the BT.2020 color space as the color space corresponding to an HDR image.
(Step S12)

Next, based on the BT.2020-YCbCr signals corresponding to an HDR image, that have been generated in Step S11, sRGB signals corresponding to the YCbCr signals are calculated.

This calculation processing is carried out using a specified RGB-YCbCr conversion table, that is, according to an ITU-R rule as the format conversion rule.

As described above, the sRGB-YCbCr format conversion can be executed according to one conversion rule (ITU-R conversion rule).

(Step S13)

Finally, in Step S13, the constituent pixel values of the output content from the sub-content source (e.g., BD-J) are set to the sRGB values calculated in Step S12. The setting values are signal values conforming to the HDR-image-supporting signal-luminance correspondence curve (SMPTE 2084 EOTF curve).

For example, the sub-content source such as BD-J outputs a sub-content image including the sRGB values generated by those processing as constituent pixel values.

By outputting such a sub-content, the linear conversion unit 412, the color space conversion unit 413, the OETF conversion unit 414, and the processing carried out by those units, that have been described above with reference to FIG. 16, can all be omitted.

In other words, by directly inputting the sRGB signals output from the sub-content source 511 to the format conversion unit 415 shown in FIG. 16 and converting them into YCbCr signals conforming to a specified format conversion rule (ITU-R), YCbCr signals in the BT.2020 color space as the HDR-image-supporting color space can be generated.

The superimposed image display processing configuration in the configuration including the sub-content source that outputs a sub-content including the sRGB values having the setting described above will be described with reference to FIG. 20.

Figure 20:
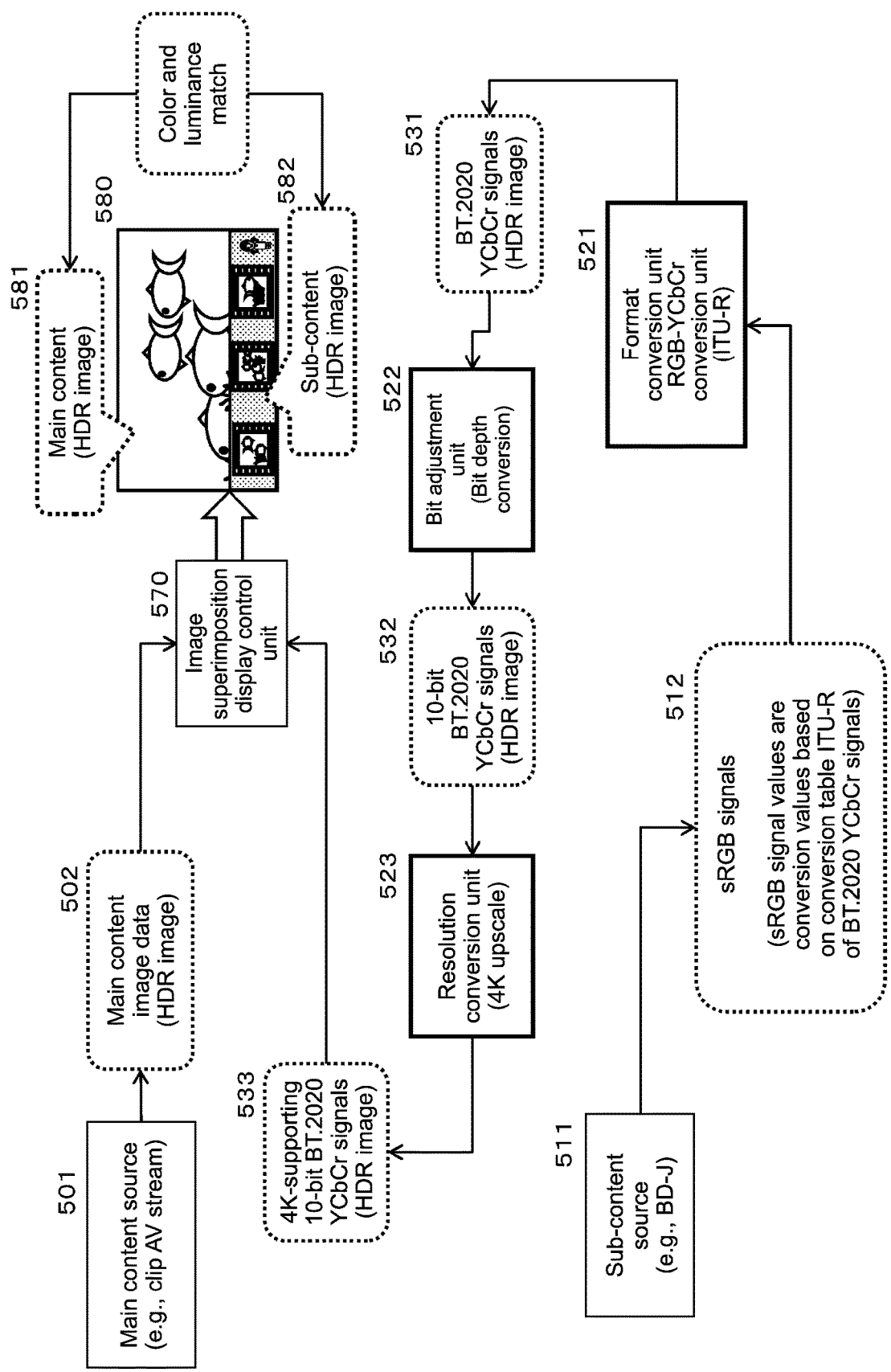
FIG. 20 is a diagram for explaining a configuration example and processing example of the apparatus that executes the superimposition display processing of a main content and a sub-content.

FIG. 20 shows a superimposed image display processing example of a case where the main content is an HDR image and the sub-content is a sub-content including an image that has the sRGB values described above, that is, the sRGB values described above with reference to FIGS. 18 and 19 set as constituent pixel values.

The main content image data 502 is output from the main content source 501 as reproduction image data.

On the other hand, sRGB signals 512 as sub-content image data are output from the sub-content source 511 to the format conversion unit 521.

Here, the sRGB signals 512 output from the sub-content source 511 are conversion values (sRGB) calculated based on the YCbCr signals in the HDR-image-supporting color space, that is, the BT.2020-YCbCr signals, using the RGB-YCbCr conversion table (ITU-R). These sRGB signal values are signal values conforming to the HDR-image-supporting signal-luminance correspondence curve (SMPTE 2084 EOTF curve) described above with reference to FIG. 3A.

By setting the output content of the sub-content source 511 to be image data configured by the thus-set sRGB values, the linear conversion unit 412, the color space conversion unit 413, the OETF conversion unit 414, and the processing carried out by those units, that have been described above with reference to FIG. 16, can all be omitted.

The sRGB signals 512 output from the sub-content source 511 are input to the format conversion unit 521.

The format conversion unit 521 inputs the sRGB signals 512 output from the sub-content source 511 and subjects them to the format conversion to generate BT.2020 YCbCr signals 531 constituted of YCbCr signals.

This format conversion between the RGB-YCbCr signals is carried out according to the ITU-R conversion rule. For example, using the ITU-R conversion table that records the correspondence relationship between the RGB signal values and the YCbCr signal values, the RGB signal values are converted into YCbCr signal values. This format conversion is similarly carried out in all apparatuses since the format conversion is executed according to one rule (specified rule of ITU-R).

As described above, the sRGB signals 512 output from the sub-content source 511 are conversion values (sRGB) calculated based on the YCbCr signals in the HDR-image-supporting color space, that is, the BT.2020-YCbCr signals, using the RGB-YCbCr conversion table (ITU-R).

Therefore, in the format conversion unit 521, the YCbCr signals calculated using the RGB-YCbCr conversion table (ITU-R) become YCbCr signals in the HDR-image-supporting color space, that is, the BT.2020-YCbCr signals.

The BT.2020 YCbCr signals 531 generated by the format conversion unit 521 are input to the bit adjustment unit 522.

For example, the sRGB signals 512 output from the sub-content source 511 and the BT.2020 YCbCr signals 531 generated by the format conversion unit 521 are configured by 8-bit signal values, and the HDR image for output is configured by 10-bit signal values.

The bit adjustment unit 522 extends the 8-bit signals to 10 bits and generates 10-bit BT.2020 YCbCr signals 532.

The 10-bit BT.2020 YCbCr signals 532 generated by the bit adjustment unit 522 are input to the resolution conversion unit 523.

The resolution conversion unit 523 executes the resolution conversion processing of causing the output image to match the resolution of the display unit (4K).

When the original sub-content is a 2K image, processing of executing the resolution conversion (2K→4K) to cause a resolution to match the resolution of the display unit is executed.

The resolution conversion unit 523 executes the resolution conversion processing of causing the resolution to match that of the display unit (4K) on the 10-bit BT.2020 YCbCr signals 532 and generates 4K-supporting 10-bit BT.2020 YCbCr signals 533.

The 4K-supporting 10-bit BT.2020 YCbCr signals 533 generated by the resolution conversion unit 523 are input to the image superimposition display control unit 570.

The image superimposition display control unit 570 inputs the main content image data 502 output from the main content source 501 and the 4K-supporting 10-bit BT.2020 YCbCr signals 533 generated by the resolution conversion unit 523 and subjects them to the superimposition processing of those images, to generate output image data with respect to the display unit.

It should be noted that the main content image data 502 output from the main content source 501 is an HDR image.

Further, the 4K-supporting 10-bit BT.2020 YCbCr signals 533 generated by the resolution conversion unit 523 constitute an HDR image generated based on the image configured by the sRGB values output from the sub-content source 511.

The sRGB values output from the sub-content source 511 are conversion values (sRGB) calculated based on the YCbCr signals in the HDR-image-supporting color space, that is, the BT.2020-YCbCr signals, using the RGB-YCbCr conversion table (ITU-R).

Therefore, in the format conversion unit 521, the YCbCr signals calculated using the RGB-YCbCr conversion table (ITU-R) are signals corresponding to an HDR image, and the 4K-supporting 10-bit BT.2020 YCbCr signals 533 output from the resolution conversion unit 523 become an HDR image.

The image superimposition display control unit 570 inputs the main content image data 502 as the HDR image, that has been output from the main content source 501, and the 4K-supporting 10-bit BT.2020 YCbCr signals 533 as the HDR image, that have been generated by the resolution conversion unit 523, and subjects them to the superimposition processing of those images, to generate output image data with respect to the display unit.

The display image 580 shown in the figure is displayed on the display unit.

The display image 580 is an image in which a sub-content 582 as the HDR image is superimposed and displayed on a partial area of a main content 581 as the HDR image.

The main content 581 and the sub-content 582 displayed on the display unit are both HDR images, so a superimposed image of those images has uniform color space and luminance level. As a result, an image output that has a sense of unity and does not let viewers feel a difference between the image contents is realized.

6. REGARDING CONTENT GENERATION AND RECORDING PROCESSING SEQUENCE AND REPRODUCTION SEQUENCE

Next, a content generation and recording processing sequence and a reproduction sequence will be described.

Figure 21:
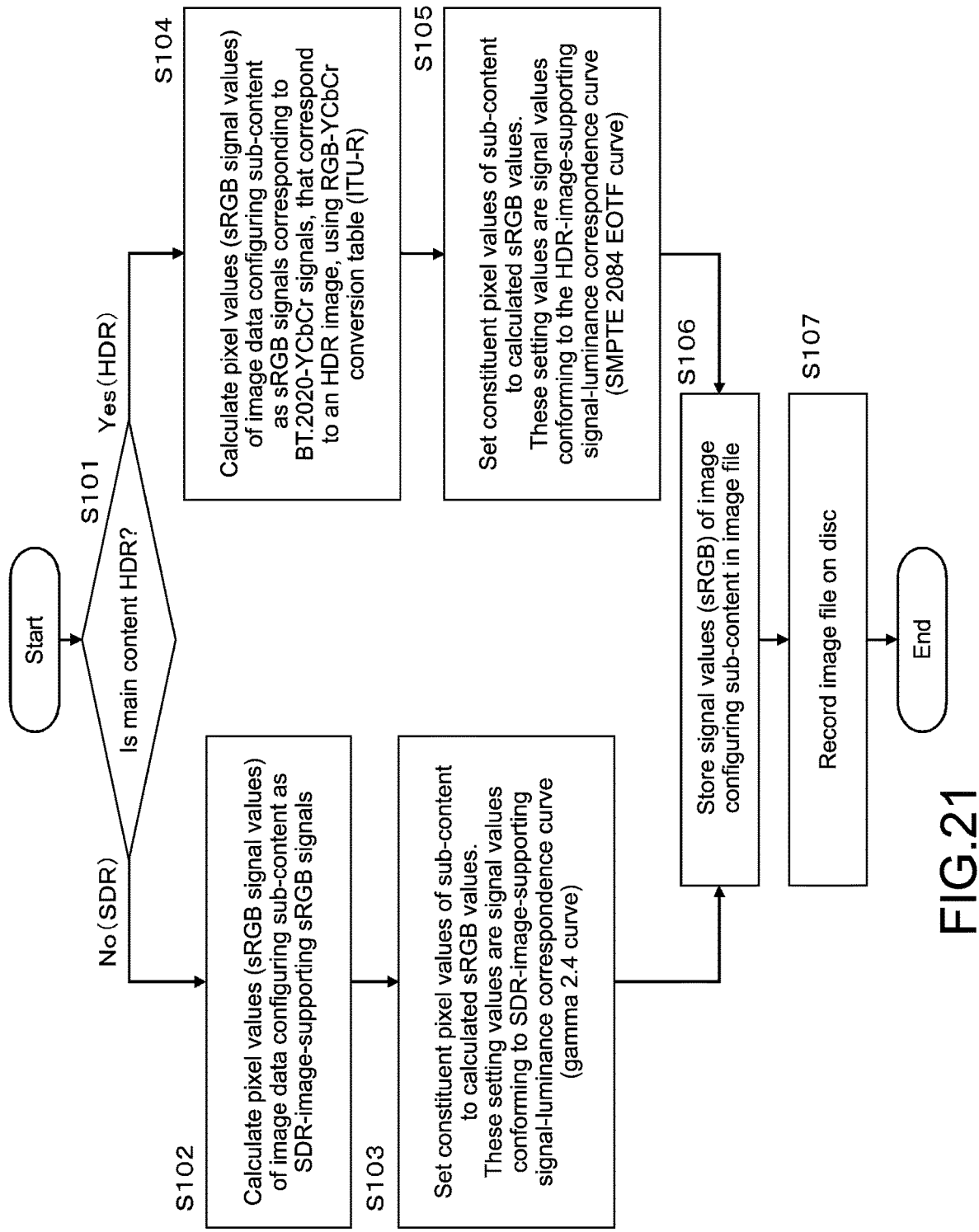
FIG. 21 is a diagram showing a flowchart for explaining a generation and recording sequence of a sub-content to be superimposed on a main content for display.

FIG. 21 is a flowchart for explaining the processing sequence of generating a sub-content and recording the generated sub-content on a disc.

Figure 22:
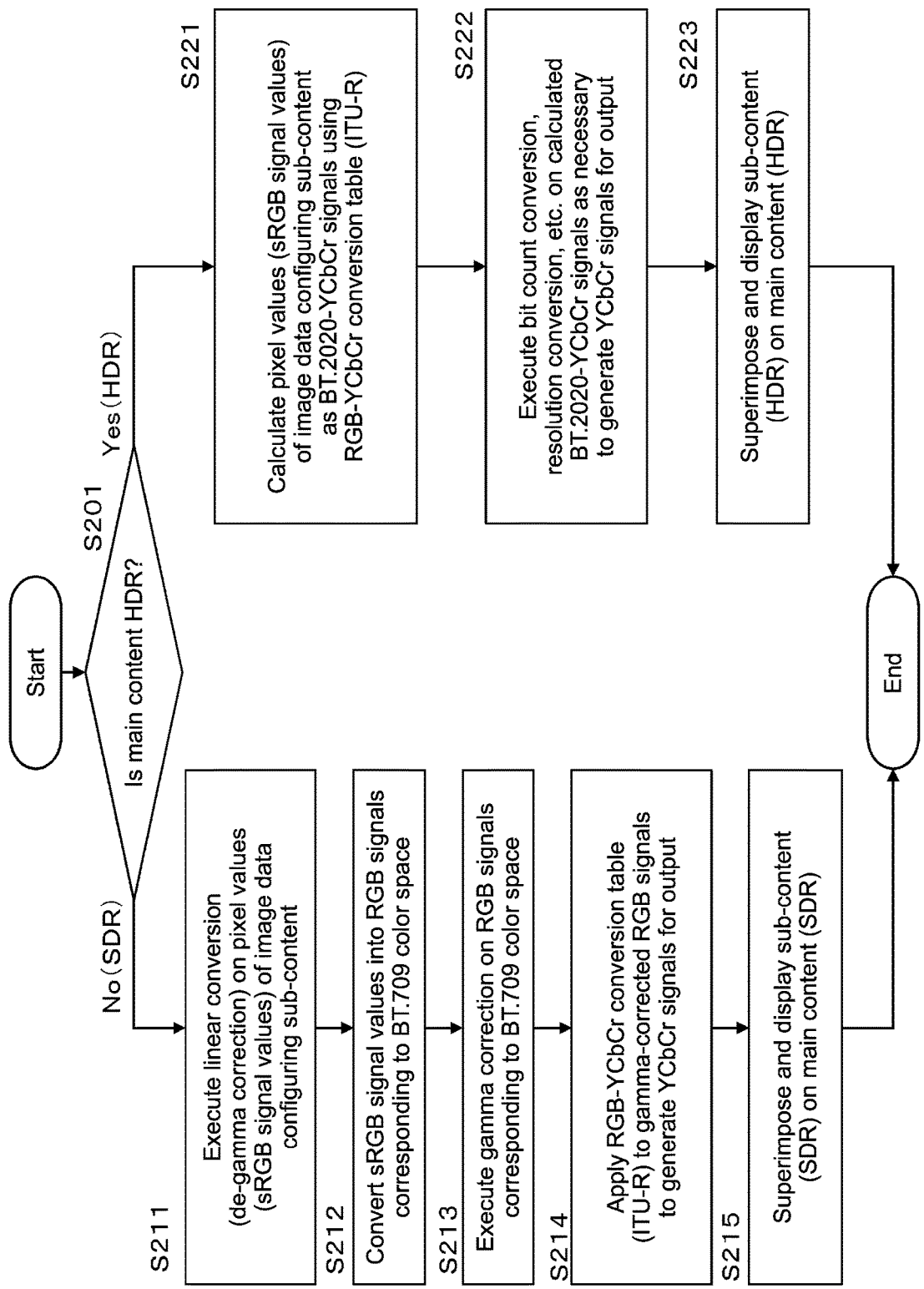
FIG. 22 is a diagram showing a flowchart for explaining a sequence of conversion processing and display processing of a sub-content to be superimposed on a main content for display.

FIG. 22 is a flowchart for explaining the processing sequence of reproducing the sub-content recorded on the disc.

First, with reference to the flowchart of FIG. 21, the processing sequence of generating a sub-content and recording the generated sub-content on a disc will be described.

It should be noted that the processing along the flow shown in FIG. 21 is executed in the information processing apparatuses that execute any of the content generation processing, disc production processing, and data recording processing with respect to a disc.

These information processing apparatuses carry out, for example, main content generation processing, processing of recording the generated main content on a disc, and sub-content generation and recording processing.

The flow shown in FIG. 21 is a flowchart in which the main content generation and recording processing is omitted and shows only the sub-content generation and recording processing.

It should be noted that there are cases where the main content is an HDR image content and cases where the main content is not an HDR image content, that is, an SDR image content. Depending on the case, the sub-content generation and recording sequence differs.

For example, when the main content is an HDR image, a sub-content to be generated and recorded becomes a content corresponding to an image including special RGB values that have been described above with reference to FIGS. 18 to 20, that is, an HDR image.

On the other hand, when the main content is an SDR image, a sub-content to be generated and recorded becomes a normal SDR content.

By making the sub-content setting (HDR or SDR) and the main content setting (HDR or SDR) match, a superimposed image of the main content and the sub-content displayed on the display unit can be made a superimposed image having a sense of unity.

Hereinafter, the processing of the steps shown in the flowchart of FIG. 21 will sequentially be described.

It should be noted that the processing along the flow shown in FIG. 21 is executed by a data processing unit of the information processing apparatus according to programs stored in a storage unit of the information processing apparatus, for example. The data processing unit is configured by a CPU including a program execution function, and the like.
(Step S101)

First, in Step S101, the data processing unit of the information processing apparatus judges which of an HDR image content and an SDR image content the already-created main content is.

When the main content is an HDR image content, the processing advances to Step S104.

On the other hand, when the main content is an SDR image content, the processing advances to Step S102.
(Step S102)

When judged that the main content is an SDR image content in the judgment processing of Step S101, the processing advances to Step S102.

In Step S102, pixel values of image data configuring a sub-content (sRGB signal values) are calculated as SDR-image-supporting sRGB signals.

Specifically, the constituent pixel values of the sub-content image are calculated as pixel values constituted of color information within the color space corresponding to normal SDR image data, such as the BT.709 color space and the BT.1886 color space.
(Step S103)

Next, the data processing unit of the information processing apparatus sets the constituent pixel values of the sub-content calculated in Step S102 as the sub-content pixel values. The setting values are signal values conforming to the SDR-image-supporting signal-luminance correspondence curve (gamma 2.4 curve).
(Step S104)

On the other hand, when judged that the main content is an HDR image content in the judgment processing of Step S101, the processing advances to Step S104.

In Step S104, pixel values of image data configuring the sub-content (sRGB signal values) are calculated as HDR-supporting sRGB signals.

Specifically, sRGB signals corresponding to the YCbCr signals are calculated based on the BT.2020-YCbCr signals corresponding to an HDR image, that are to be output as the HDR image.

This calculation processing is carried out using a specified RGB-YCbCr conversion table, that is, according to the ITU-R rule as the format conversion rule.

As described above, the sRGB-YCbCr format conversion can be executed according to one conversion rule (ITU-R conversion rule).
(Step S105)

Next, in Step S105, the sub-content constituent pixel values are set to the calculated sRGB values. The setting values are signal values conforming to the HDR-image-supporting signal-luminance correspondence curve (SMPTE 2084 EOTF curve).
(Steps S106 to S107)

Upon ending the processing of Step S103 or S105, the signal values (sRGB) of the image configuring the sub-content are stored in an image file in Step S106, and the image file is recorded on the disc in Step S107.

By these processing, when the main content is an HDR image, the sub-content is also recorded on the disc as image data including pixel values corresponding to an HDR image (sRGB).

On the other hand, when the main content is an SDR image, the sub-content is also recorded on the disc as image data including pixel values corresponding to an SDR image (sRGB).

Next, a sequence of the reproduction processing of reading out each content from the disc on which the main content and sub-content are recorded and superimposing and displaying the contents will be described with reference to the flowchart shown in FIG. 22.

The information processing apparatus that executes the content reproduction processing changes the sub-content reproduction sequence depending on which of the HDR image and the SDR image the main content is.

As described above with reference to the flowchart of FIG. 21, when the main content is an HDR image, the sub-content is also recorded on the disc as an HDR image.

Specifically, a sub-content constituted of an HDR image set with the RGB values calculated according to the RGB-YCbCr conversion rule (ITU-R) that has been described above with reference to FIGS. 18 to 20 is recorded on the disc.

On the other hand, when the main content is an SDR image, the sub-content is also recorded on the disc as an SDR image.

When the main content is recorded as an HDR image and the sub-content is also recorded as an image set with special RGB values corresponding to an HDR image, that is, the RGB values calculated according to the RGB-YCbCr conversion rule (ITU-R) that has been described above with reference to FIGS. 18 to 20, the processing described above with reference to FIG. 20 is executed.

In this case, the main content and the sub-content are both displayed as HDR images on the display unit, and thus an image having a sense of unity with matched color and luminance levels between the two contents is displayed.

On the other hand, when the main content and the sub-content are both SDR images, the processing described above with reference to FIG. 12 is executed. In this case, the main content and the sub-content are both displayed as SDR images on the display unit, and thus an image having a sense of unity with matched color and luminance levels between the two contents is displayed.

It should be noted that the processing along the flow shown in FIG. 22 is executed by the data processing unit of the information processing apparatus according to programs stored in the storage unit of the information processing apparatus, for example. The data processing unit is configured by a CPU including a program execution function, and the like.

Hereinafter, the processing of the steps shown in the flowchart of FIG. 22 will sequentially be described.
(Step S201)

First, in Step S201, the data processing unit of the information processing apparatus judges which of an HDR image content and an SDR image content the main content recorded on the disc is.

When the main content is an HDR image content, the processing advances to Step S221.

On the other hand, when the main content is an SDR image content, the processing advances to Step S211.
(Step S211)

When judged that the main content is an SDR image content in the judgment processing of Step S201, the processing advances to Step S211.

In Step S211 and subsequent steps, the processing described above with reference to FIG. 12 is executed with respect to the sub-content.

In Step S211, the linear conversion processing is executed on pixel values (sRGB signals) of image data configuring the SDR image as the sub-content image data. This processing corresponds to the processing carried out by the linear conversion unit 225 shown in FIG. 12.

The sub-content is an SDR image, and a correspondence relationship between the sRGB signal values and luminance of the pixels of the SDR image becomes a relationship conforming to the gamma 2.4 curve shown in FIG. 3B.

The linear conversion processing is executed as processing of converting the correspondence relationship between the signal values and luminance, that conforms to the gamma 2.4 curve, into a linear relationship. Specifically, the correspondence relationship between the signal values and the luminance is converted into the linear relationship by the de-gamma processing that uses the gamma 2.4 curve.
(Step S212)

The linear sRGB signals 222b generated by the linear conversion unit 225 shown in FIG. 12 are input to the color space conversion unit 226.

The sub-content output from the sub-content source 221 is an SDR image, and pixel values in a color space defined by the sRGB values (sRGB color space) are set.

In Step S212, the pixel values are converted into signals in the BT.709 color space that has been described above with reference to FIG. 5.

This processing is the processing carried out by the color space conversion unit 226 shown in FIG. 12.
(Step S213)

The color space conversion unit 226 shown in FIG. 12 inputs the BT.709 linear RGB signals 222c generated by the color space conversion to the OETF conversion unit (photoelectric conversion unit) 227.

In Step S213, the OETF conversion unit (photoelectric conversion unit) 227 executes the OETF conversion (photoelectric conversion) processing on the BT.709 linear RGB signals 222c whose signal-luminance correspondence relationship is a linear relationship to generate BT.709 GB signals 222d.

In the OETF conversion processing carried out by the OETF conversion unit (photoelectric conversion unit) 227, the SDR-image-supporting signal-luminance correspondence relationship curve that has been described above with reference to FIG. 3B, that is, the gamma 2.4 curve, is used.

The OETF conversion unit (photoelectric conversion unit) 227 outputs the BT.709 RGB signals 222d generated by the photoelectric conversion processing that uses the gamma 2.4 curve to the format conversion unit 228.

The BT.709 RGB signals 222d are SDR signals having input/output characteristics (signal-luminance characteristics) conforming to the gamma 2.4 curve shown in FIG. 3B.
(Step S214)

Next, the format conversion unit 228 shown in FIG. 12 inputs the BT.709 RGB signals 222d and subjects them to the format conversion, to generate BT.709 YCbCr signals 222e constituted of YCbCr signals.

This format conversion between the RGB-YCbCr signals is carried out according to the ITU-R conversion rule. For example, using the ITU-R conversion table that records the correspondence relationship between the RGB signal values and the YCbCr signal values, the RGB signal values are converted into YCbCr signal values. This format conversion is similarly carried out in all apparatuses since the format conversion is executed according to one rule (specified rule of ITU-R).
(Step S215)

The BT.709 YCbCr signals 222e generated by the format conversion unit 228 shown in FIG. 12 are input to the image superimposition display control unit 230. In Step S215, the image superimposition display control unit 230 inputs the main content image data 212 output from the main content source 211 shown in FIG. 12 and the BT.709 YCbCr signals 222e generated by the format conversion unit 228 and subjects them to the superimposition processing of those images, to generate output image data with respect to the display unit.

It should be noted that the main content image data 212 output from the main content source 211 and the BT.709 YCbCr signals 222e that are based on the image data output from the sub-content source 221 are both SDR images.

The display image 231 as shown in FIG. 12 is displayed on the display unit.

The display image 231 becomes an image in which the sub-content 233 as the SDR image is superimposed and displayed on a partial area of the main content 232 as the SDR image.

Since the main content 232 and the sub-content 233 are both SDR images, an image having a sense of unity without a difference in the color and luminance levels between the contents is obtained.

On the other hand, when judged that the main content is an HDR image in Step S201, the processing of Steps S221 to S223 is executed.

In this case, the main content is recorded as the HDR image, and the sub-content is recorded as an image set with special RGB values corresponding to an HDR image, that is, the RGB values calculated according to the RGB-YCbCr conversion rule (ITU-R) that has been described above with reference to FIGS. 18 to 20.

When the main content is an HDR image, a content producer or disc manufacturer produces or records, on a disc, a sub-content constituted of an image having special RGB values corresponding to the HDR image.

Specifically, the sub-content constituted of an image having special RGB values corresponding to the HDR image is produced or recorded on a disc by the processing executed along the flowchart shown in FIG. 21 above.

The processing of Step S221 and subsequent steps corresponds to the processing described above with reference to FIG. 20.

Hereinafter, the processing of Step S221 and subsequent steps will be described.

(Step S221)

The processing of Step S221 corresponds to that of the format conversion unit 521 shown in FIG. 20.

The sRGB signals 512 as sub-content image data are output from the sub-content source 511 shown in FIG. 20 to the format conversion unit 521.

The sRGB signals 512 output from the sub-content source 511 are conversion values (sRGB) calculated based on the YCbCr signals in the HDR-image-supporting color space, that is, the BT.2020-YCbCr signals, using the RGB-YCbCr conversion table (ITU-R). These sRGB signal values are signal values conforming to the HDR-image-supporting signal-luminance correspondence curve (SMPTE 2084 EOTF curve) described above with reference to FIG. 3A.

The format conversion unit 521 inputs the sRGB signals 512 output from the sub-content source 511 and subjects them to the format conversion to generate BT.2020 YCbCr signals 531 constituted of YCbCr signals.

This format conversion between the RGB-YCbCr signals is carried out according to the ITU-R conversion rule. For example, using the ITU-R conversion table that records the correspondence relationship between the RGB signal values and the YCbCr signal values, the RGB signal values are converted into YCbCr signal values. This format conversion is similarly carried out in all apparatuses since the format conversion is executed according to one rule (specified rule of ITU-R).

As described above, the YCbCr signals calculated using the RGB-YCbCr conversion table (ITU-R) become YCbCr signals in the HDR-image-supporting color space, that is, the BT.2020-YCbCr signals.

(Step S222)

Next, the BT.2020 YCbCr signals 531 generated by the format conversion unit 521 shown in FIG. 20 are input to the bit adjustment unit 522 shown in FIG. 20.

The processing of Step S222 corresponds to the processing of the bit adjustment unit 522 and the resolution conversion unit 523.

As described above, the sRGB signals 512 output from the sub-content source 511 and the BT.2020 YCbCr signals 531 generated by the format conversion unit 521 are configured by 8-bit signal values, and the HDR image for output is configured by 10-bit signal values.

The bit adjustment unit 522 extends the 8-bit signals to 10 bits and generates 10-bit BT.2020 YCbCr signals 532.

The 10-bit BT.2020 YCbCr signals 532 generated by the bit adjustment unit 522 are input to the resolution conversion unit 523.

The resolution conversion unit 523 executes the resolution conversion processing of causing the output image to match the resolution of the display unit (4K).

When the original sub-content is a 2K image, the processing of executing the resolution conversion (2K→4K) to cause a resolution to match the resolution of the display unit is executed.

The resolution conversion unit 523 executes the resolution conversion processing of causing the resolution to match that of the display unit (4K) on the 10-bit BT.2020 YCbCr signals 532 and generates 4K-supporting 10-bit BT.2020 YCbCr signals 533.

(Step S223)

The 4K-supporting 10-bit BT.2020 YCbCr signals 533 generated by the resolution conversion unit 523 shown in FIG. 20 are input to the image superimposition display control unit 570.

The processing of Step S223 corresponds to that of the image superimposition display control unit 570.

The image superimposition display control unit 570 inputs the main content image data 502 output from the main content source 501 and the 4K-supporting 10-bit BT.2020 YCbCr signals 533 generated by the resolution conversion unit 523 and subjects them to the superimposition processing of those images, to generate output image data with respect to the display unit.

It should be noted that the main content image data 502 output from the main content source 501 shown in FIG. 20 is an HDR image.

Further, the 4K-supporting 10-bit BT.2020 YCbCr signals 533 generated by the resolution conversion unit 523 constitute an HDR image generated based on the image configured by the sRGB values output from the sub-content source 511.

The sRGB values output from the sub-content source 511 are conversion values (sRGB) calculated based on the YCbCr signals in the HDR-image-supporting color space, that is, the BT.2020-YCbCr signals, using the RGB-YCbCr conversion table (ITU-R).

Therefore, in the format conversion unit 521, the YCbCr signals calculated using the RGB-YCbCr conversion table (ITU-R) are signals corresponding to an HDR image, and the 4K-supporting 10-bit BT.2020 YCbCr signals 533 output from the resolution conversion unit 523 become an HDR image.

The image superimposition display control unit 570 inputs the main content image data 502 as the HDR image output from the main content source 501 and the 4K-supporting 10-bit BT.2020 YCbCr signals 533 as the HDR image, that have been generated by the resolution conversion unit 523, and subjects them to the superimposition processing of those images, to generate output image data with respect to the display unit.

The display image 580 shown in FIG. 20 is displayed on the display unit.

The display image 580 is an image in which the sub-content 582 as the HDR image is superimposed and displayed on a partial area of the main content 581 as the HDR image.

The main content 581 and the sub-content 582 displayed on the display unit are both HDR images, so a superimposed image of those images has uniform color space and luminance level. As a result, an image output that has a sense of unity and does not let viewers feel a difference between the image contents is realized.

7. REGARDING PROCESSING EXAMPLE IN WHICH RESTRICTION IS PROVIDED IN CONVERSION PROCESSING

In the embodiment described with reference to FIGS. 17 to 22, the information processing apparatus that executes the content reproduction processing executes the following processing.

Specifically, the processing involves inputting, when the main content is an HDR image, RGB values that are constituent pixel values of a sub-content to a format conversion unit, converting the RGB values into HDR-image-supporting YCbCr signals according to a specified conversion rule, and generating and outputting output image signals using the conversion signals.

However, when such a conversion processing function becomes indispensable, there arises a problem that a large load is applied to the apparatus.

Hereinafter, a processing example that takes into account such a problem, that is, a processing example in which a restriction is provided in the conversion processing will be described.

The image data conversion processing can be categorized as follows, for example.
(a) Dynamic range conversion processing
(b) Color space conversion processing The image conversion processing can be roughly categorized into the two processing described above.

HDR images have a wider dynamic range and color space that can be output than SDR images.

In the embodiment described above with reference to FIGS. 17 to 22, the information processing apparatus that executes the content reproduction processing carries out data conversion that enables both the dynamic range and the color space to be converted into those of an HDR image.

However, for example, the conversion processing becomes a large load on the apparatus as described above. Further, when the color space conversion processing is set as necessary and the dynamic range conversion processing is set as arbitrary according to the standard, at least two types of apparatuses exist. One is a first apparatus that executes both the color space conversion processing and the dynamic conversion processing and the other is a second apparatus that executes only the color space conversion processing and not the dynamic conversion processing. Under such a situation, a content provider may need to prepare sub-contents such as a menu respectively for the first and second apparatuses. In addition, even when carrying out the color space conversion processing, in a case of a conversion into a rather wide color space such as BT.2020, quality after the conversion processing cannot be ensured, and a result unfavorable for the user may be obtained.

To solve the problems as described above, for example, processing restrictions as follows may be set in a content unit or an information recording medium (media) unit.
(1) Prohibit and not apply the dynamic range conversion processing on a wide dynamic range of an image
(2) Prohibit and not apply the color space conversion processing on a color space of an image having a wide color gamut (e.g., BT.2020), provided that in a case of an output using BT.709 as color space processing of the related art, that does not cause a large processing load, conversion processing of converting the color space into the same color space is carried out.

For example, the processing restrictions of (1) and (2) above may be set in a predetermined data unit such as a content unit and an information recording medium (media) unit.

Specific examples of the processing restrictions include the following, for example.
(a) When a main content is an image generated according to the BT.709 color space, the image is output as an image that has been subjected to processing of converting the main content and a sub-content such as a menu into the same color space. Also when an output destination supports only BT.709 and not BT.2020 or when a content to be output based on a user instruction and the like is converted into an image conforming to the BT.709 color space, the sub-content is similarly output as an image that has been subjected to the processing of converting the color space into the same BT.709 color space.
(b) When a main content is an image generated according to the BT.2020 color space, processing of converting a color space of a sub-content such as a menu, that has been generated according to the BT.709 color space, into that of BT.2020 is not carried out. On the other hand, a sub-content that has been generated according to the BT.2020 color space is output as it is as an image generated according to the BT.2020 color space. Also when a content to be output based on a user instruction and the like is to be made an image conforming to the BT.2020 color space, the processing of converting the color space of the sub-content into that of BT.2020 is not carried out.
(c) Converting an image of a sub-content such as a menu having a standard dynamic range of the related art into an image having a high dynamic range specified by SMPTE 2084 (SMPTE ST 2084) is prohibited. Conversely, when the output destination supports only the standard dynamic range of the related art and not the high dynamic range specified by SMPTE 2084, the content of the high dynamic range is converted into the standard dynamic range to be output.

For example, the processing restrictions as described above may be set in a predetermined data unit such as a content unit and an information recording medium (media) unit and executed by the information processing apparatus that reproduces contents.

Since such an information processing apparatus converts color spaces of a main content image and a sub-content image into the same color space in a case where the main content is an image of the BT.709 color space, a feeling of strangeness that users feel when color shades differ can be reduced. On the other hand, when the main content is an image of the BT.2020 color space, since conversion of the sub-content image into that of the BT.2020 color space that causes a large processing load is prohibited, a load on the information processing apparatus can be reduced. Further, since conversion into the BT.2020 color space that requires a large conversion and cannot ensure quality is prohibited, inconveniences for the user can be reduced. Furthermore, since conversion of the sub-content image into a high dynamic range is prohibited, the load on the information processing apparatus can be reduced.

The examples of prohibiting both the color space conversion processing into a wide color space and the dynamic conversion processing into a high dynamic range have been described, but only one of them may be prohibited. For example, any one of (a) to (c) above or a combination of two of them may be used.

8. REGARDING CONFIGURATION EXAMPLE OF INFORMATION PROCESSING APPARATUS

Figure 23:
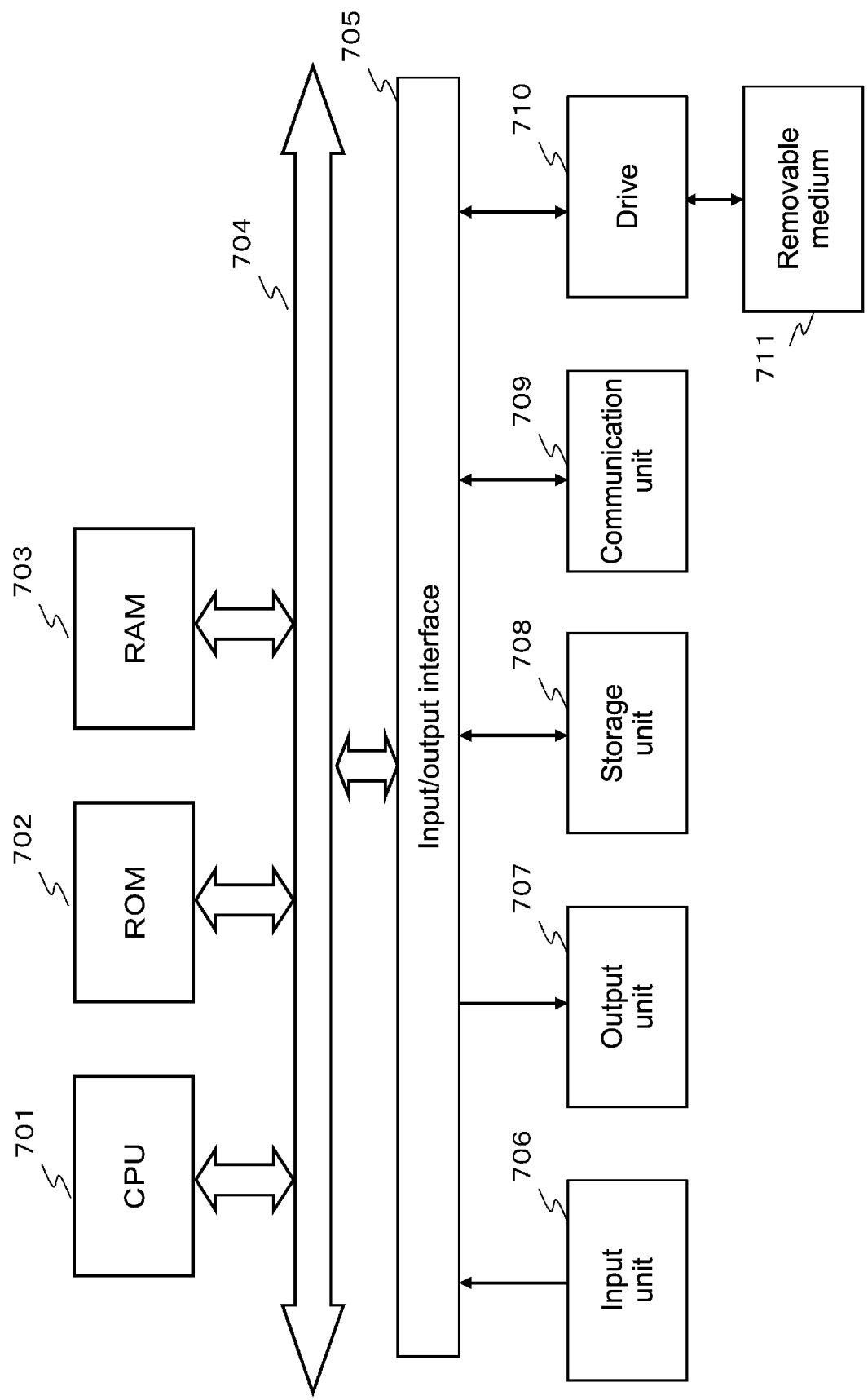
FIG. 23 is a diagram for explaining a hardware configuration example of an information processing apparatus applicable as a disc reproducing apparatus, a recording apparatus, or an information recording medium production apparatus.

Next, a hardware configuration example of the information processing apparatus applicable as a reproducing apparatus of an information recording medium such as a disc, a recording apparatus, and an information recording medium production apparatus will be described with reference to FIG. 23.

A CPU (Central Processing Unit) 701 functions as the data processing unit that executes various types of processing according to programs stored in a ROM (Read Only Memory) 702 or a storage unit 708. For example, the processing according to the sequence described in embodiments above is executed. A RAM (Random Access Memory) 703 stores programs executed by the CPU 701, data, and the like. The CPU 701, the ROM 702, and the RAM 703 are mutually connected via a bus 704.

The CPU 701 is connected to an input/output interface 705 via the bus 704, and an input unit 706 constituted of various switches, a keyboard, a mouse, a microphone, and the like and an output unit 707 constituted of a display, a speaker, and the like are connected to the input/output interface 705. The CPU 701 carries out various types of processing in response to instructions input via the input unit 706 and outputs processing results to, for example, the output unit 707.

The storage unit 708 connected to the input/output interface 705 is constituted of, for example, a hard disk, and stores programs to be executed by the CPU 701 and various types of data. A communication unit 709 functions as a transmission/reception unit for data communication made via a network such as the Internet and a local area network and a transmission/reception unit for broadcast waves and communicates with external apparatuses.

A drive 710 connected to the input/output interface 705 drives a removable medium 711 such as a magnetic disk, an optical disc, a magneto-optical disc, and a semiconductor memory such as a memory card and records and reads data on/from the removable medium 711.

9. CONCLUSION OF CONFIGURATION OF PRESENT DISCLOSURE

Heretofore, embodiments of the present disclosure has been described with reference to the specific examples. However, it is obvious that embodiments can be corrected or substituted by those skilled in the art without departing from the gist of the present disclosure. In other words, the present invention has been disclosed in the form of examples and should not be interpreted limitedly. For determining the gist of the present disclosure, the scope of claims should be taken into consideration.

It should be noted that the technique disclosed in the specification may also take the following configurations.

(1) An information processing apparatus that reproduces data recorded onto a recording medium, the apparatus including:
circuitry configured to
convert a color space of an image recorded onto the recording medium, and
superimpose a main content image and a sub-content image recorded onto the recording medium,
wherein, when a color space of the main content image corresponds to BT.709 format, the circuitry determines to convert color spaces of the sub-content image and the main content image into the same color space, and
wherein, when the color space of the main content image corresponds to BT.2020 format, the circuitry determines to not convert the color space of the sub-content image into BT.2020 format.

(2) The information processing apparatus according to (1), wherein the same color space corresponds to BT.709 format.

(3) The information processing apparatus according to (1) or (2), wherein the circuitry is further configured to
convert a dynamic range of the image recorded onto the recording medium, wherein, when a dynamic range of the main content image corresponds to high dynamic range (HDR), the circuitry determines to not convert a dynamic range of the sub-content image into HDR.

(4) The information processing apparatus according to any of (1) to (3), wherein the circuitry is further configured to apply no color space conversion to the color space of the sub-content image, when the color space of the main content image corresponds to BT.2020 format.

(5) An information processing apparatus that reproduces data recorded onto a recording medium, the apparatus including:
circuitry configured to
convert a color space of an image recorded onto the recording medium, and
superimpose a main content image and a sub-content image recorded onto the recording medium.
wherein, when a color space of the main content image corresponds to BT.709 format, the circuitry determines to convert color spaces of the sub-content image and the main content image into the same color space, and
wherein, when the color space of the main content image corresponds to BT.2020 format, no color space conversion is applied to the color space of the sub-content image.

(6) An information processing method for reproducing data recorded onto a recording medium, the method including:
converting a color space of an image recorded onto the recording medium; and
superimposing a main content image and a sub-content image recorded onto the recording medium,
wherein, when a color space of the main content image corresponds to BT.709 format, the color spaces of the sub-content image and the main content image are converted into the same color space, and wherein, when the color space of the main content image corresponds to BT.2020 format, the color space of the sub-content image is not converted into BT.2020 format.

(7) A non-transitory computer-readable medium having embodied thereon a program, which when executed by a computer causes the computer to execute an information processing method for reproducing data recorded onto a recording medium, the method including:
  converting a color space of an image recorded onto the recording medium; and
  superimposing a main content image and a sub-content image recorded onto the recording medium.
  wherein, when a color space of the main content image corresponds to BT.709 format, the color spaces of the sub-content image and the main content image are converted into the same color space, and
  wherein, when the color space of the main content image corresponds to BT.2020 format, the color space of the sub-content image is not converted into BT.2020 format.

(8) An information processing apparatus, including
  a data processing unit that executes processing of reproducing data recorded onto
  an information recording medium,
    the data processing unit
      judging whether a main content recorded onto the information recording medium is an HDR (High Dynamic Range) image, and
      inputting, when the main content is an HDR image, in output image generation processing of a sub-content that is to be reproduced with the main content, RGB values that are constituent pixel values of a sub-content output from a sub-content source to a format conversion unit, converting the RGB values into HDR-image-supporting YCbCr signals according to a specified conversion rule, and generating output image signals using the conversion signals.

(9) The information processing apparatus according to (8), in which
  the specified conversion rule is a conversion rule conforming to an ITU-R recommendation.

(10) The information processing apparatus according to (9), in which
  the RGB values that are constituent pixel values output from the sub-content source are RGB values as conversion values calculated based on BT.2020-YCbCr signals corresponding to an HDR image according to an RGB-YCbCr conversion rule which is a conversion rule conforming to the ITU-R recommendation.

(11) The information processing apparatus according to (10), in which
  the RGB values that are constituent pixel values output from the sub-content source are signal values conforming to an HDR-image-supporting signal-luminance correspondence curve (SMPTE 2084 EOTF curve).

(12) The information processing apparatus according to any one of (8) to (11), in which
  the data processing unit converts, when the main content is an SDR (Standard Dynamic Range) image, in the output image generation processing of a sub-content that is to be reproduced with the main content, the RGB values that are constituent pixel values of a sub-content output from the sub-content source into BT.709-YCbCr signals or BT.1886 YCbCr signals corresponding to an SDR image, and generates output image signals using the conversion signals.

(13) An information processing apparatus, including
  a data processing unit that executes processing of generating data to be recorded onto an information recording medium,
    the data processing unit
      judging whether a main content to be recorded onto the information recording medium is an HDR (High Dynamic Range) image, and
      setting, when the main content is an HDR image, in generation processing of a sub-content that is to be recorded onto the information recording medium together with the main content, RGB values that are constituent pixel values of the sub-content to RGB values obtained by converting HDR-image-supporting YCbCr signals according to a specified conversion rule.

(14) The information processing apparatus according to (13), in which
  the specified conversion rule is a conversion rule conforming to an ITU-R recommendation.

(15) The information processing apparatus according to (14), in which
  the RGB values that are constituent pixel values of the sub-content are conversion values calculated based on BT.2020-YCbCr signals corresponding to an HDR image according to an RGB-YCbCr conversion rule which is a conversion rule conforming to the ITU-R recommendation.

(16) The information processing apparatus according to (15), in which
  the RGB values that are constituent pixel values of the sub-content are signal values conforming to an HDR-image-supporting signal-luminance correspondence curve (SMPTE 2084 EOTF curve).

(17) The information processing apparatus according to any one of (13) to (16), in which
  the data processing unit sets, when the main content is an SDR (Standard Dynamic Range) image, in the generation processing of a sub-content that is to be recorded onto the information recording medium together with the main content, the RGB values that are constituent pixel values of the sub-content to RGB values corresponding to a BT.709 color space or a BT.1886 color space corresponding to an SDR image.

(18) An information recording medium that records a main content and a sub-content together with the main content, in which
  when the main content is an HDR (High Dynamic Range) image,
  the sub-content is a sub-content whose RGB values, that are constituent pixel values of the sub-content, are set as RGB values obtained by converting HDR-image-supporting YCbCr signals according to a specified conversion rule, and
  the main content and the sub-content to be reproduced can both be output as HDR images in a reproducing apparatus that reproduces contents from the information recording medium.

(19) The information recording medium according to (18), in which
  the specified conversion rule is a conversion rule conforming to an ITU-R recommendation.

(20) The information recording medium according to (19), in which
the RGB values that are constituent pixel values of the sub-content are conversion values calculated based on BT.2020-YCbCr signals corresponding to an HDR image according to an RGB-YCbCr conversion rule which is a conversion rule conforming to the ITU-R recommendation.

(21) The information recording medium according to (20), in which
the RGB values that are constituent pixel values of the sub-content are signal values conforming to an HDR-image-supporting signal-luminance correspondence curve (SMPTE 2084 EOTF curve).

(22) The information recording medium according to any one of (18) to (21), in which
when the main content is an SDR (Standard Dynamic Range) image,
the RGB values that are constituent pixel values of the sub-content are set to RGB values corresponding to a BT.709 color space or a BT.1886 color space corresponding to an SDR image, and
the main content and the sub-content to be reproduced can both be output as SDR images in the reproducing apparatus that reproduces contents from the information recording medium.

(23) An information processing method executed in an information processing apparatus including a data processing unit that executes processing of reproducing data recorded onto an information recording medium, the method including:
by the data processing unit.
judging whether a main content recorded onto the information recording medium is an HDR (High Dynamic Range) image; and
inputting, when the main content is an HDR image, in output image generation processing of a sub-content that is to be reproduced with the main content, RGB values that are constituent pixel values of a sub-content output from a sub-content source to a format conversion unit, converting the RGB values into HDR-image-supporting YCbCr signals according to a specified conversion rule, and generating output image signals using the conversion signals.

(24) An information processing method executed in an information processing apparatus including a data processing unit that executes processing of generating data to be recorded onto an information recording medium, the method including:
by the data processing unit.
judging whether a main content to be recorded onto the information recording medium is an HDR (High Dynamic Range) image; and
setting, when the main content is an HDR image, in the generation processing of a sub-content that is to be recorded onto the information recording medium together with the main content, RGB values that are constituent pixel values of the sub-content to RGB values obtained by converting HDR-image-supporting YCbCr signals according to a specified conversion rule.

(25) A program that causes information processing to be executed in an information processing apparatus including a data processing unit that executes processing of reproducing data recorded onto an information recording medium, the program causing the data processing unit to execute:
processing of judging whether a main content recorded onto the information recording medium is an HDR (High Dynamic Range) image; and
processing of inputting, when the main content is an HDR image, in output image generation processing of a sub-content that is to be reproduced with the main content, RGB values that are constituent pixel values of a sub-content output from a sub-content source to a format conversion unit, converting the RGB values into HDR-image-supporting YCbCr signals according to a specified conversion rule, and generating output image signals using the conversion signals.

(26) A program that causes information processing to be executed in an information processing apparatus including a data processing unit that executes processing of reproducing data recorded onto an information recording medium, the program causing the data processing unit to execute:
processing of judging whether a main content to be recorded onto the information recording medium is an HDR (High Dynamic Range) image; and
processing of setting, when the main content is an HDR image, in the generation processing of a sub-content that is to be recorded onto the information recording medium together with the main content, RGB values that are constituent pixel values of the sub-content to RGB values obtained by converting HDR-image-supporting YCbCr signals according to a specified conversion rule.

(27) An information processing apparatus that reproduces data recorded onto a recording medium, including:
a color space conversion unit that converts a color space of an image recorded onto the recording medium; and
an image superimposition unit that superimposes a main content image and a sub-content image recorded onto the recording medium,
the color space conversion unit converting, when a color space of the main content image is BT.709, color spaces of the sub-content image and the main content image into the same color space and avoiding converting, when the color space of the main content image is BT.2020, the color space of the sub-content image into BT.2020.

(28) The information processing apparatus according to (27), further including
a dynamic range conversion unit that converts a dynamic range of the image,
in which the dynamic range conversion unit avoids converting, when a dynamic range of the main content image is HDR, a dynamic range of the sub-content image into HDR.

Furthermore, the series of processing described in the specification can be executed either by hardware or software, or by a combined configuration of hardware and software. When the processing is executed by software, the programs recording the processing sequences can be installed in a built-in memory of a computer, that is incorporated into dedicated hardware, or installed in a general-purpose computer capable of executing various types of processing to be executed. For example, the programs can be recorded in advance on the recording medium. Instead of installing the programs in a computer from the recording medium, the programs can be received via a network such as a LAN (Local Area Network) and the Internet and installed in a recording medium such as a built-in hard disk.

It should be noted that instead of being executed in time series according to the descriptions, the various types of processing described in the specification may be executed in parallel or individually according to processing performance of an apparatus that executes the processing, or as necessary. Further, the system used in the specification refers to a configuration in which a plurality of apparatuses are assembled logically, and the apparatuses having the respective configurations are not necessarily provided in the same casing.

INDUSTRIAL APPLICABILITY

As described heretofore, according to embodiments of the present disclosure, outputs in which the HDR images and the SDR images are mixed are avoided, and image outputs having a uniform image quality are realized.

Specifically, when a main content recorded onto the information recording medium is an HDR image, RGB values that are constituent pixel values of a sub-content to be recorded onto the information recording medium together with the main content are set to RGB values obtained by converting HDR-image-supporting YCbCr signals according to a specified conversion rule (ITU-R). In the sub-content output image generation processing, the reproducing apparatus inputs RGB values that are constituent pixel values of a sub-content output from a sub-content source to a format conversion unit, converts the RGB values into HDR-image-supporting YCbCr signals according to the specified conversion rule (ITU-R), and generates output image signals using the conversion signals.

Furthermore, with the structure according to embodiments of the present disclosure, by prohibiting the dynamic range conversion processing and color space processing, a load on the information processing apparatus and a load on a content producer can be reduced.

Specifically, even when the main content is constituted of HDR images, dynamic conversion processing of SDR images constituting a sub-content is not carried out. In addition, even when the main content is constituted of images conforming to BT.2020 as a wide color space, wide color gamut conversion processing of images constituting a sub-content, that conform to BT.709, is not carried out.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 10 information recording medium
11 management information setting section
12 data section
101 photographing unit
102 grading/mastering unit
103 photoelectric conversion unit
104 encoding unit
105 recording unit
120 recording medium
151 decoding unit
152 electro-optical linear conversion unit
153 display signal generation unit
154 display unit
201 main content
202 sub-content
211 main content source
212 main content image data
221 sub-content source
222 sub-content image data
225 linear conversion unit
226 color space conversion unit
227 OETF conversion unit
228 format conversion unit
230 image superimposition display control unit
231 display image
232 main content
233 sub-content
241 main content source
242 main content image data
251 sub-content source
252 sub-content image data
260 image superimposition display control unit
261 display image
262 main content
263 sub-content
271 main content source
272 main content image data
281 sub-content source
282 sub-content image data
290 image superimposition display control unit
291 display image
292 main content
293 sub-content
311 main content source
312 main content image data
321 sub-content source
322 sub-content image data
330 image superimposition display control unit
331 display image
332 main content
333 sub-content
401 main content source
402 main content image data
411 sub-content source
412 linear conversion unit
413 color space conversion unit
414 OETF conversion unit
415 format conversion unit
416 bit adjustment unit
417 resolution conversion unit
430 image superimposition display control unit
431 display image
441 main content
442 sub-content
501 main content source
502 main content image data
511 sub-content source
512 sub-content image data (sRGB signals)
521 format conversion unit
522 bit adjustment unit
523 resolution conversion unit
570 image superimposition display control unit
580 display image
581 main content
582 sub-content
701 CPU
702 ROM
703 RAM
704 bus
705 input/output interface
706 input unit
707 output unit
708 storage unit
709 communication unit
710 drive
711 removable medium

The invention claimed is:

1. An information processing apparatus that reproduces data recorded onto a recording medium, the apparatus comprising:
   circuitry configured to
   convert a color space of an image recorded onto the recording medium,
   convert a dynamic range of the image recorded onto the recording medium, and
   superimpose a main content image and a sub-content image recorded onto the recording medium,
   wherein, when a color space of the main content image corresponds to BT.709 format, the circuitry determines to convert color spaces of the sub-content image and the main content image into a same color space,
   wherein, when the color space of the main content image corresponds to BT.2020 format, the circuitry determines to not convert the color space of the sub-content image into BT.2020 format, and
   wherein, when a dynamic range of the main content image corresponds to high dynamic range (HDR) having expanded color and luminance ranges as compared to standard dynamic range (SDR), the circuitry determines to not convert a dynamic range of the sub-content image into HDR.

2. The information processing apparatus according to claim 1, wherein the same color space corresponds to BT.709 format.

3. The information processing apparatus according to claim 1, wherein the circuitry is further configured to apply no color space conversion to the color space of the sub-content image, when the color space of the main content image corresponds to BT.2020 format.

4. An information processing apparatus that reproduces data recorded onto a recording medium, the apparatus comprising:
   circuitry configured to
   convert a color space of an image recorded onto the recording medium,
   convert a dynamic range of the image recorded onto the recording medium, and
   superimpose a main content image and a sub-content image recorded onto the recording medium,
   wherein, when a color space of the main content image corresponds to BT.709 format, the circuitry determines to convert color spaces of the sub-content image and the main content image into a same color space,
   wherein, when the color space of the main content image corresponds to BT.2020 format, no color space conversion is applied to the color space of the sub-content image, and
   wherein, when a dynamic range of the main content image corresponds to high dynamic range (HDR) having expanded color and luminance ranges as compared to standard dynamic range (SDR), no conversion is applied to a dynamic range of the sub-content image.

5. An information processing method for reproducing data recorded onto a recording medium, the method comprising:
   converting a color space of an image recorded onto the recording medium;
   converting a dynamic range of the image recorded onto the recording medium; and
   superimposing a main content image and a sub-content image recorded onto the recording medium,
   wherein, when a color space of the main content image corresponds to BT.709 format, the color spaces of the sub-content image and the main content image are converted into a same color space,
   wherein, when the color space of the main content image corresponds to BT.2020 format, the color space of the sub-content image is not converted into BT.2020 format, and
   wherein, when a dynamic range of the main content image corresponds to high dynamic range (HDR) having expanded color and luminance ranges as compared to standard dynamic range (SDR), a dynamic range of the sub-content image is not converted into HDR.

6. A non-transitory computer-readable medium having embodied thereon a program, which when executed by a computer causes the computer to execute an information processing method for reproducing data recorded onto a recording medium, the method comprising:
   converting a color space of an image recorded onto the recording medium;
   converting a dynamic range of the image recorded onto the recording medium; and
   superimposing a main content image and a sub-content image recorded onto the recording medium,
   wherein, when a color space of the main content image corresponds to BT.709 format, the color spaces of the sub-content image and the main content image are converted into a same color space,
   wherein, when the color space of the main content image corresponds to BT.2020 format, the color space of the sub-content image is not converted into BT.2020 format, and
   wherein, when a dynamic range of the main content image corresponds to high dynamic range (HDR) having expanded color and luminance ranges as compared to standard dynamic range (SDR), a dynamic range of the sub-content image is not converted into HDR.

* * * * *